United States Patent
Maiyuran et al.

(10) Patent No.: US 11,636,174 B2
(45) Date of Patent: *Apr. 25, 2023

(54) SCALABLE SPARSE MATRIX MULTIPLY ACCELERATION USING SYSTOLIC ARRAYS WITH FEEDBACK INPUTS

(71) Applicant: Intel Corporation, Santa Clara, CA (US)

(72) Inventors: Subramaniam Maiyuran, Gold River, CA (US); Jorge Parra, El Dorado Hills, CA (US); Supratim Pal, Bangalore (IN); Ashutosh Garg, Folsom, CA (US); Shubra Marwaha, Folsom, CA (US); Chandra Gurram, Folsom, CA (US); Darin Starkey, Roseville, CA (US); Durgesh Borkar, Folsom, CA (US); Varghese George, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,882

(22) Filed: Nov. 16, 2021

(65) Prior Publication Data

US 2022/0156343 A1    May 19, 2022

Related U.S. Application Data

(63) Continuation of application No. 16/913,800, filed on Jun. 26, 2020, now Pat. No. 11,204,977.

(30) Foreign Application Priority Data

May 5, 2020  (IN) .............................. 202041019059

(51) Int. Cl.
G06F 17/16    (2006.01)
G06F 9/30     (2018.01)
G06F 15/80    (2006.01)

(52) U.S. Cl.
CPC ............ G06F 17/16 (2013.01); G06F 9/3001 (2013.01); G06F 9/30145 (2013.01); G06F 15/8046 (2013.01)

(58) Field of Classification Search
None
See application file for complete search history.

(56) References Cited

U.S. PATENT DOCUMENTS 9,207,908 B1 * 12/2015 Langhammer ........ G06F 7/5443
10,387,122 B1 *  8/2019 Olsen ....................... G06F 7/72
10,628,622 B1 *  4/2020 Sivaraman .............. G06F 30/33
(Continued)

FOREIGN PATENT DOCUMENTS

CN    113610697      11/2021
DE    102020131666   11/2021
TW    202143031      11/2021

*Primary Examiner* — Eric Coleman
(74) *Attorney, Agent, or Firm* — Jaffery Watson Mendonsa & Hamilton LLP

(57) ABSTRACT

Described herein is an accelerator device including a host interface, a fabric interconnect coupled with the host interface, and one or more hardware tiles coupled with the fabric interconnect, the one or more hardware tiles including sparse matrix multiply acceleration hardware including a systolic array with feedback inputs.

20 Claims, 37 Drawing Sheets

(56) References Cited

U.S. PATENT DOCUMENTS

| | | | |
|---|---|---|---|
| 10,678,508 B2* | 6/2020 | Vantrease | G06F 7/16 |
| 2016/0140084 A1* | 5/2016 | Daga | G06F 17/16 |
| | | | 708/207 |
| 2017/0052857 A1* | 2/2017 | Jennings | G06F 11/1679 |
| 2018/0189234 A1* | 7/2018 | Nurvitadhi | G06F 17/16 |
| 2019/0042269 A1* | 2/2019 | Pearce | G06F 9/4806 |
| 2019/0042542 A1* | 2/2019 | Narayanamoorthy | G06F 9/383 |
| 2019/0205737 A1* | 7/2019 | Bleiweiss | G06N 3/0445 |
| 2019/0278600 A1* | 9/2019 | Frumkin | G06N 3/0472 |
| 2019/0379396 A1* | 12/2019 | Bajic | H03M 7/3066 |
| 2020/0160181 A1* | 5/2020 | Zlateski | G06N 20/10 |
| 2021/0349966 A1 | 11/2021 | Maiyuran et al. | |

* cited by examiner

SCALABLE SPARSE MATRIX MULTIPLY ACCELERATION USING SYSTOLIC ARRAYS WITH FEEDBACK INPUTS

CROSS-REFERENCE

This present application is a continuation application of U.S. application Ser. No. 16/913,800, filed Jun. 26, 2020, which claims priority to India provisional patent application number 202041019059, filed on May 5, 2020, which is hereby incorporated herein by reference.

BACKGROUND

Systolic matrix multiplication used in machine learning workloads have a significant percentage of zeros (sparse-data workloads). Multiplication of these zeros can be skipped and thus, overall performance improved. Current systolic architectures may provide support for sparsity within workloads, but such architectures may not gracefully scale.

BRIEF DESCRIPTION OF THE DRAWINGS

So that the manner in which the features of the present embodiments can be understood in detail, a more particular description of the embodiments may be had by reference to the detailed description below and the appended drawings. It is to be noted, however, that the appended drawings illustrate only typical embodiments and are therefore not to be considered limiting of its scope.

DETAILED DESCRIPTION

Described herein are devices, systems and methods to enable scalable sparse matrix multiply acceleration using systolic arrays with feedback inputs.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1 through 13A-13B provide an overview of exemplary data processing system and graphics processor logic that incorporates or relates to the various embodiments. FIGS. 14-26 provide specific details of the various embodiments. Some aspects of the following embodiments are described with reference to a graphics processor, while other aspects are described with respect to a general-purpose processor, such as a central processing unit (CPU). Similar techniques and teachings can be applied to other types of circuits or semiconductor devices, including but not limited to a many integrated core processor, a GPU cluster, or one or more instances of a field programmable gate array (FPGA). In general, the teachings are applicable to any processor or machine that manipulates or processes image (e.g., sample, pixel), vertex data, or geometry data or that performs parallel processing operations for machine learning and high-performance computing applications.

System Overview

Figure 1:
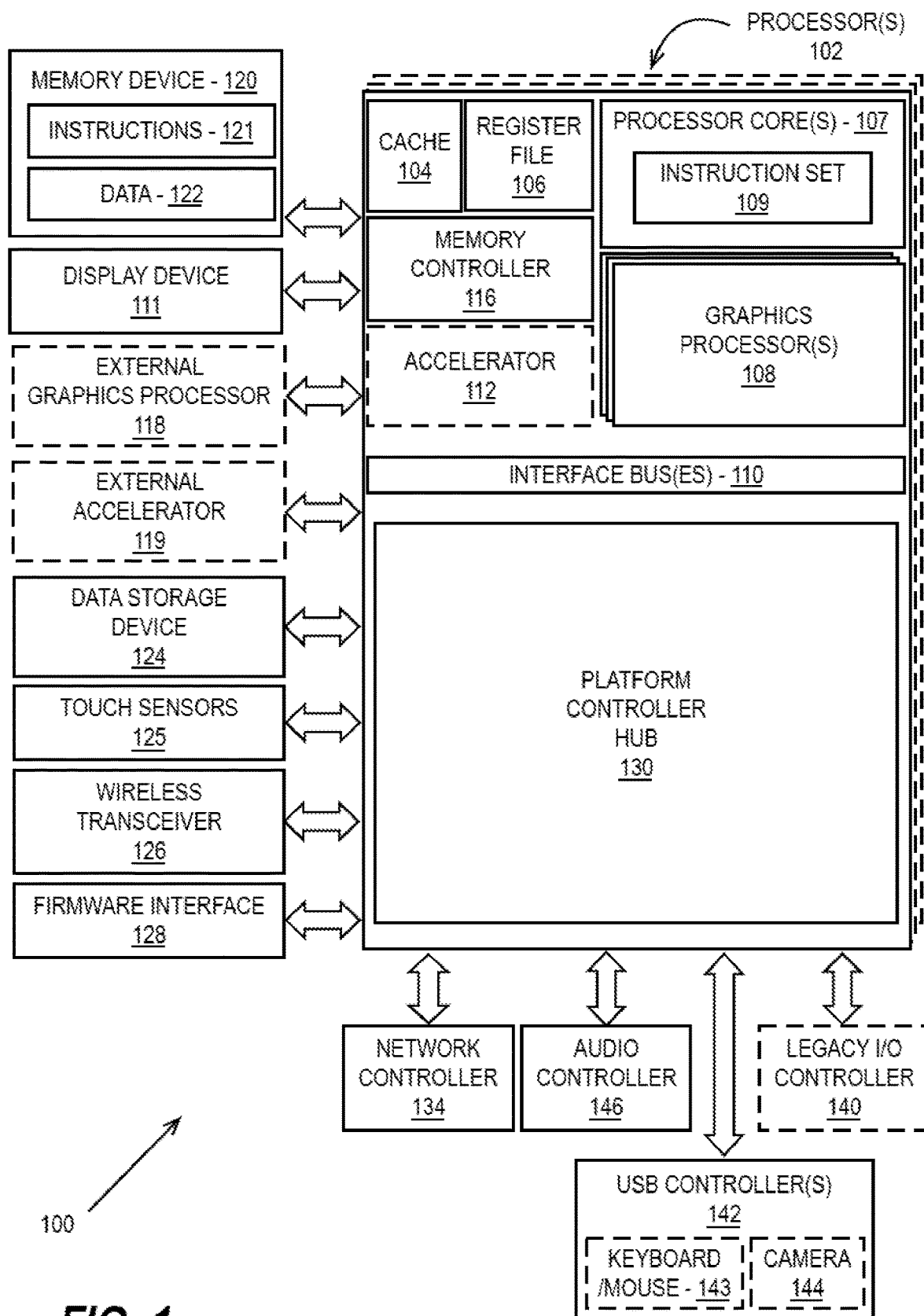
FIG. 1 is a block diagram of a processing system, according to an embodiment.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is exemplary and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors) on an as needed basis, enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIG. 2A-2D illustrate computing systems and graphics processors provided by embodiments described herein. The elements of FIG. 2A-2D having the same reference numbers (or names) as the elements of any other figure herein can operate or function in any manner similar to that described elsewhere herein, but are not limited to such.

Figure 2A:
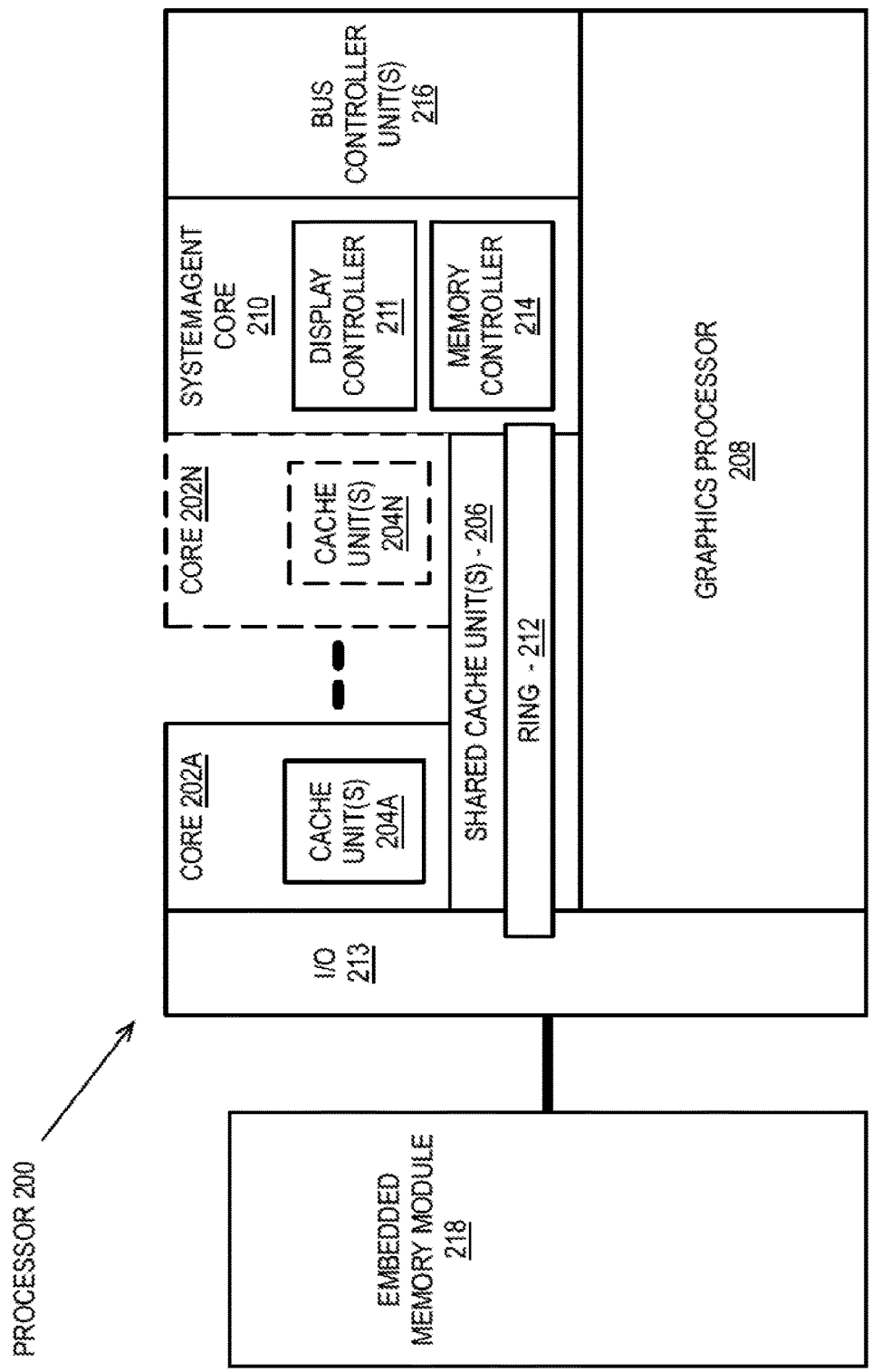
FIG. 2A-2D illustrate computing systems and graphics processors provided by embodiments described herein.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring-based interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
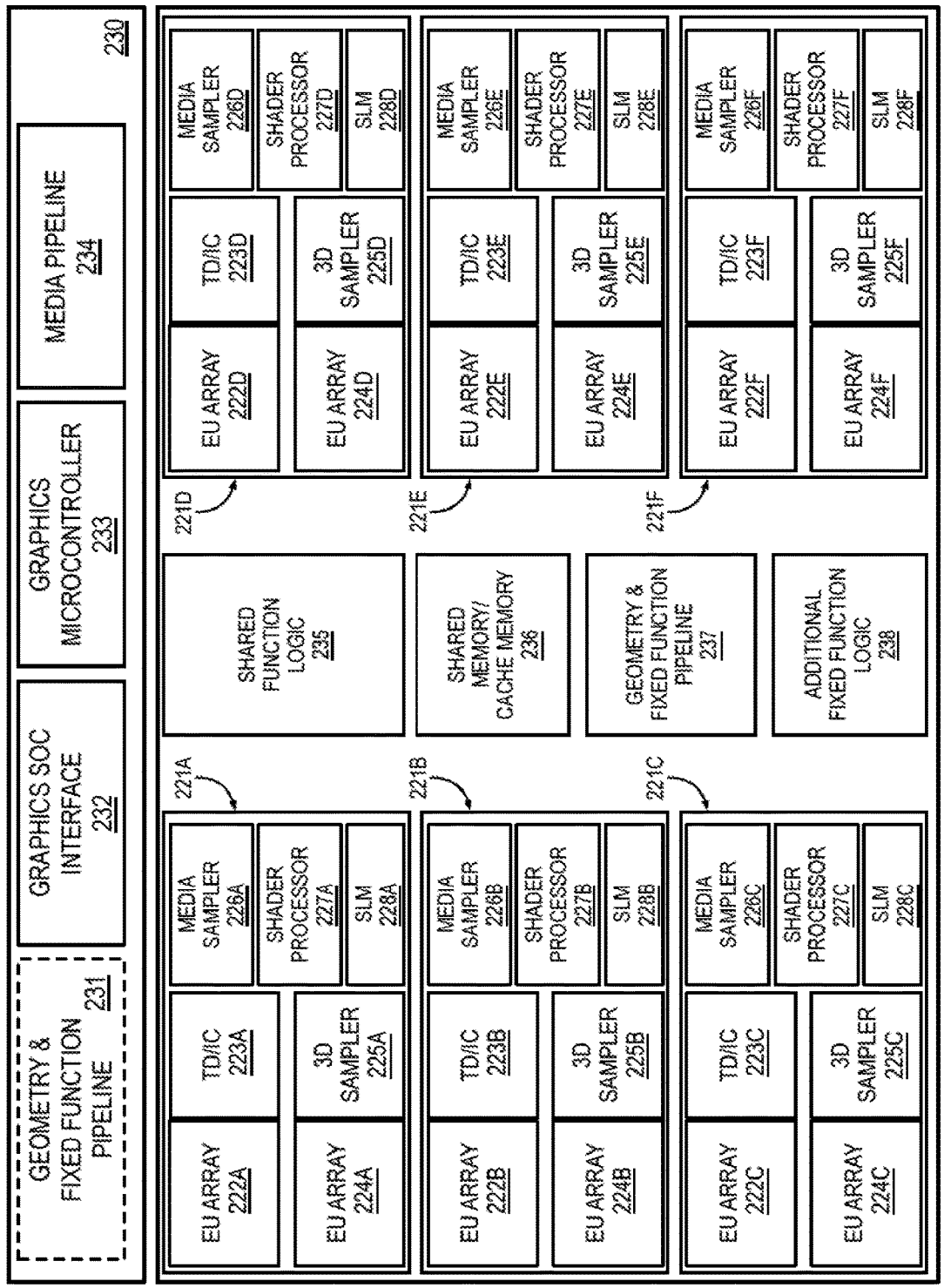

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is exemplary of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3A and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and preemption. The media pipeline 234 (e.g., media pipeline 316 of FIG. 3A and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphics core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates critical results faster than the full pipeline, as the cull pipeline fetches and shades only the position attribute of the vertices, without performing rasterization and rendering of the pixels to the frame buffer. The cull pipeline can use the generated critical results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 226A-226F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 226A-226F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
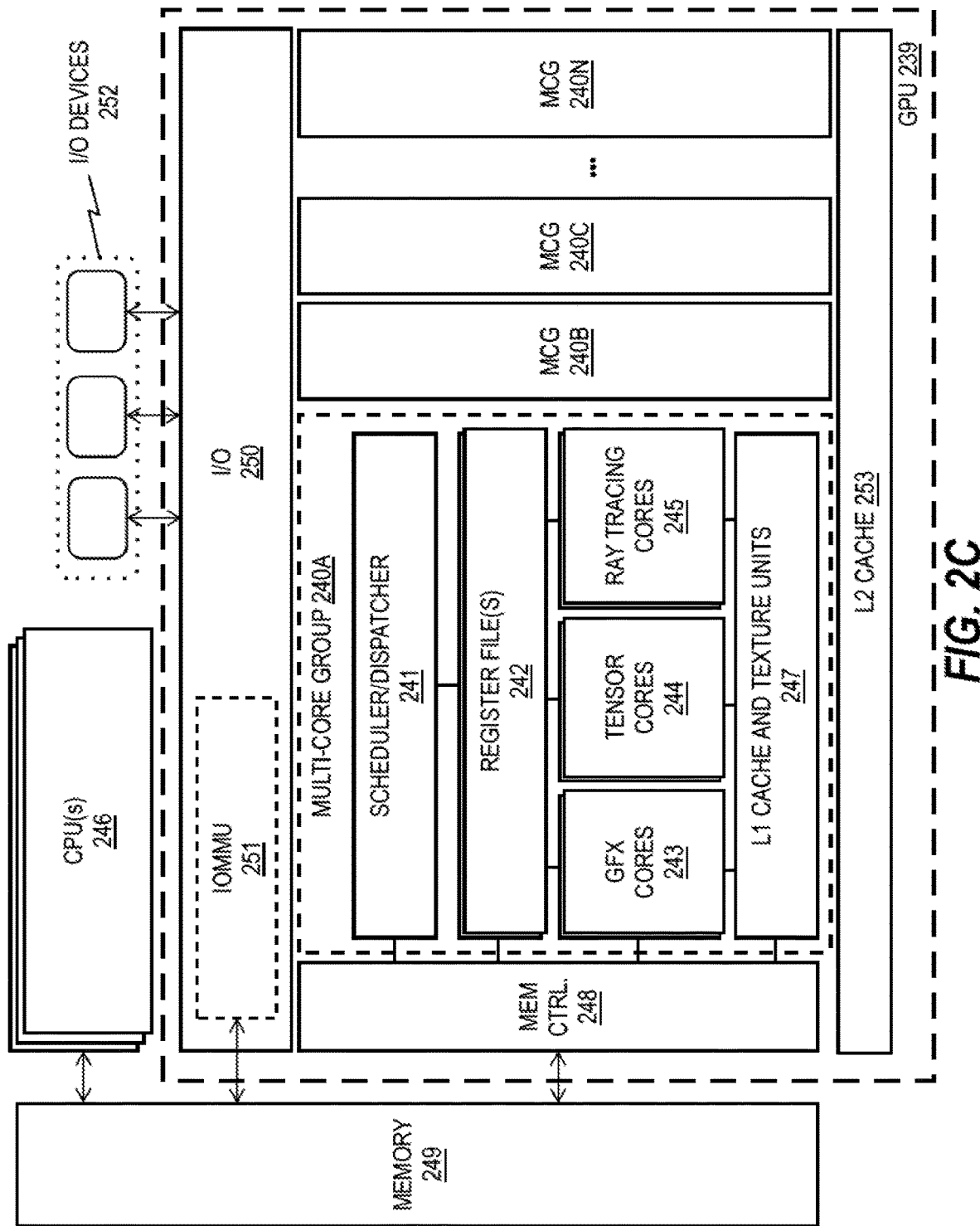

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating-point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPU(s) 246, GPU(s) 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles of the invention are not limited to this specific implementation.

In one embodiment, the tensor cores 244 include a plurality of execution units specifically designed to perform matrix operations, which are the fundamental compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, requires a significant number matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high-speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 245, graphics cores 243 and tensor cores 244 is Vulkan 1.1.85. Note, however, that the underlying principles of the invention are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

RayGeneration—Ray generation instructions may be executed for each pixel, sample, or other user-defined work assignment.

ClosestHit— A closest hit instruction may be executed to locate the closest intersection point of a ray with primitives within a scene.

AnyHit—An any hit instruction identifies multiple intersections between a ray and primitives within a scene, potentially to identify a new closest intersection point.

Intersection—An intersection instruction performs a ray-primitive intersection test and outputs a result.

Per-primitiveBoundingboxConstruction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
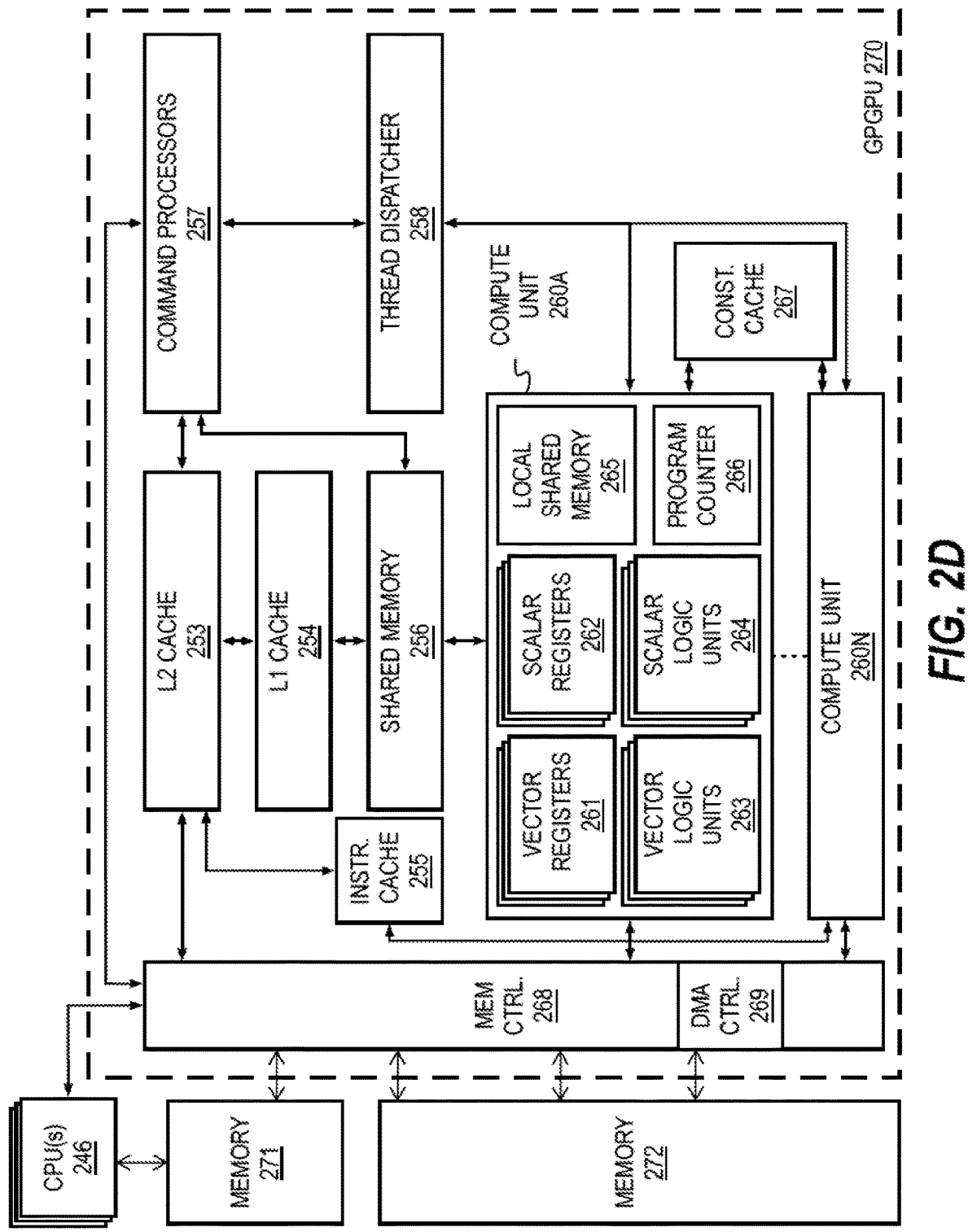

FIG. 2D is a block diagram of general-purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally, each compute unit 260A-260N can be independently configured for conditional computation and can conditionally output the results of computation to memory. The command processors 257 can interrupt the one or more CPU(s) 246 when the submitted commands are complete.

Figure 3A:
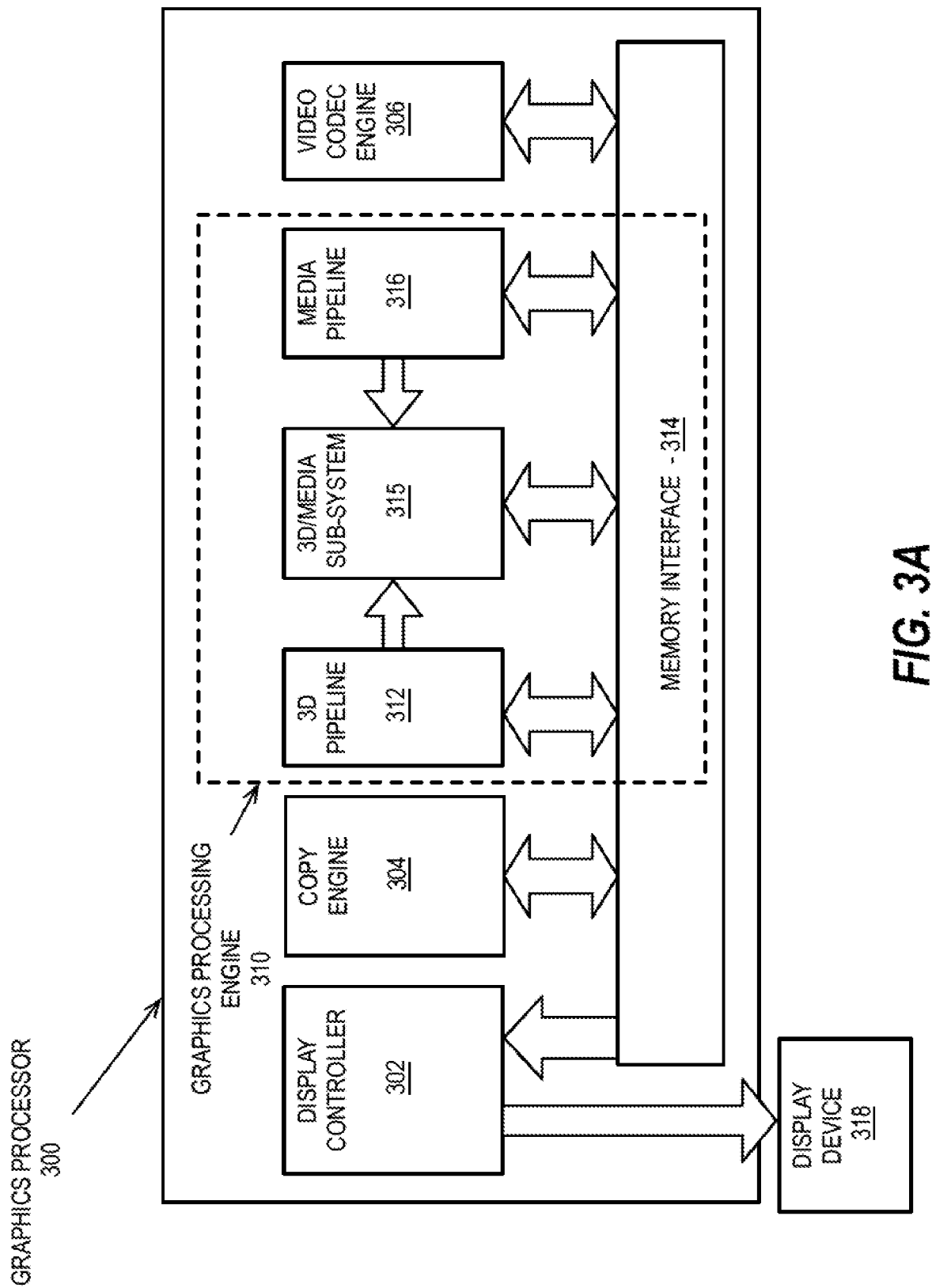
FIG. 3A-3C illustrate block diagrams of additional graphics processor and compute accelerator architectures provided by embodiments described herein.
Figure 3B:
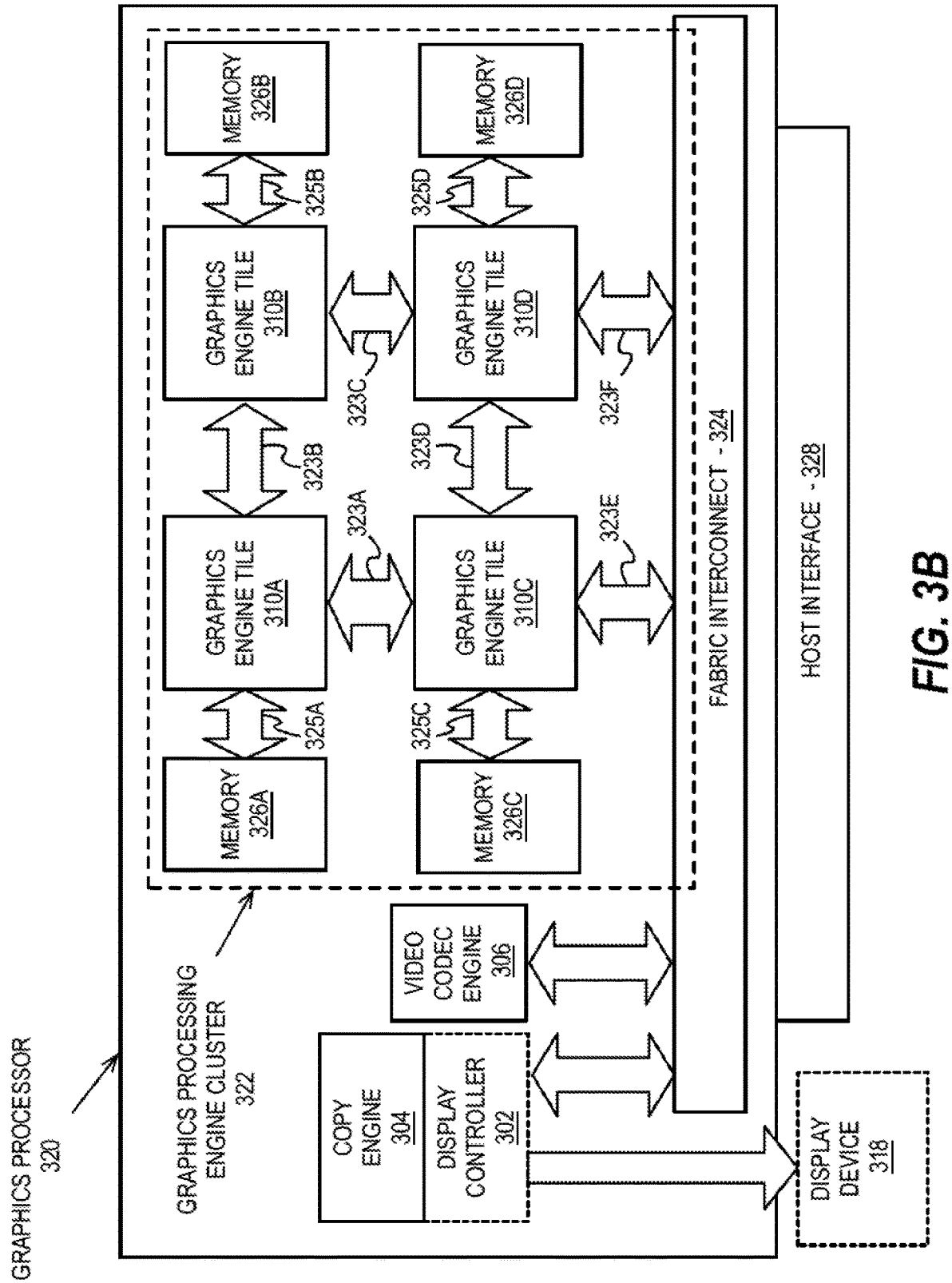
Figure 3C:
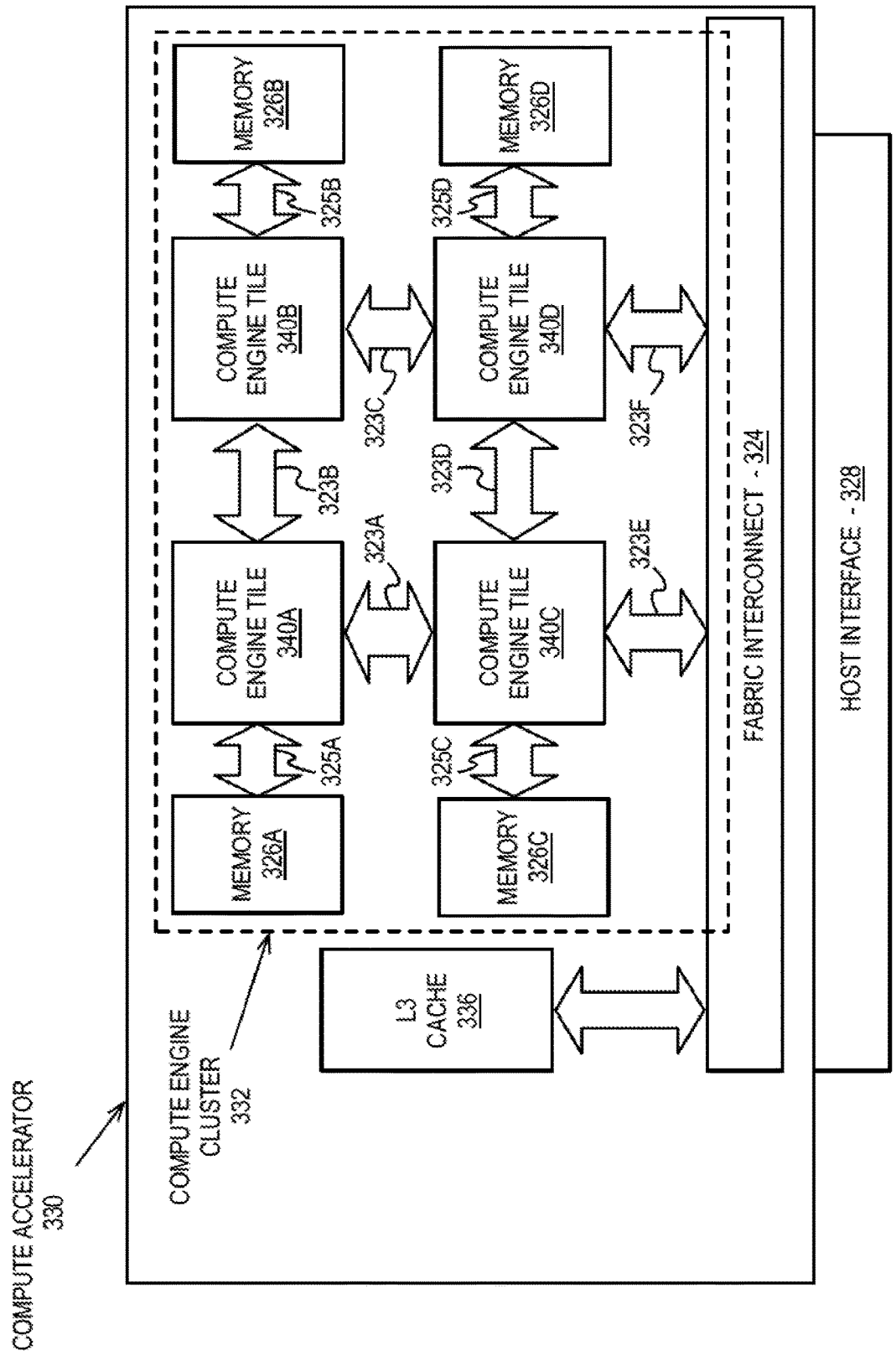

FIG. 3A-3C illustrate block diagrams of additional graphics processor and compute accelerator architectures provided by embodiments described herein. The elements of FIG. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIG. 11B-11D.

The graphics processor 320 may be configured with a non-uniform memory access (NUMA) system in which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to keep a consistent memory image when more than one cache stores the same memory location.

The graphics processing engine cluster 322 can connect with an on-chip or on-package fabric interconnect 324. The fabric interconnect 324 can enable communication between graphics engine tiles 310A-310D and components such as the video codec engine 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large L3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
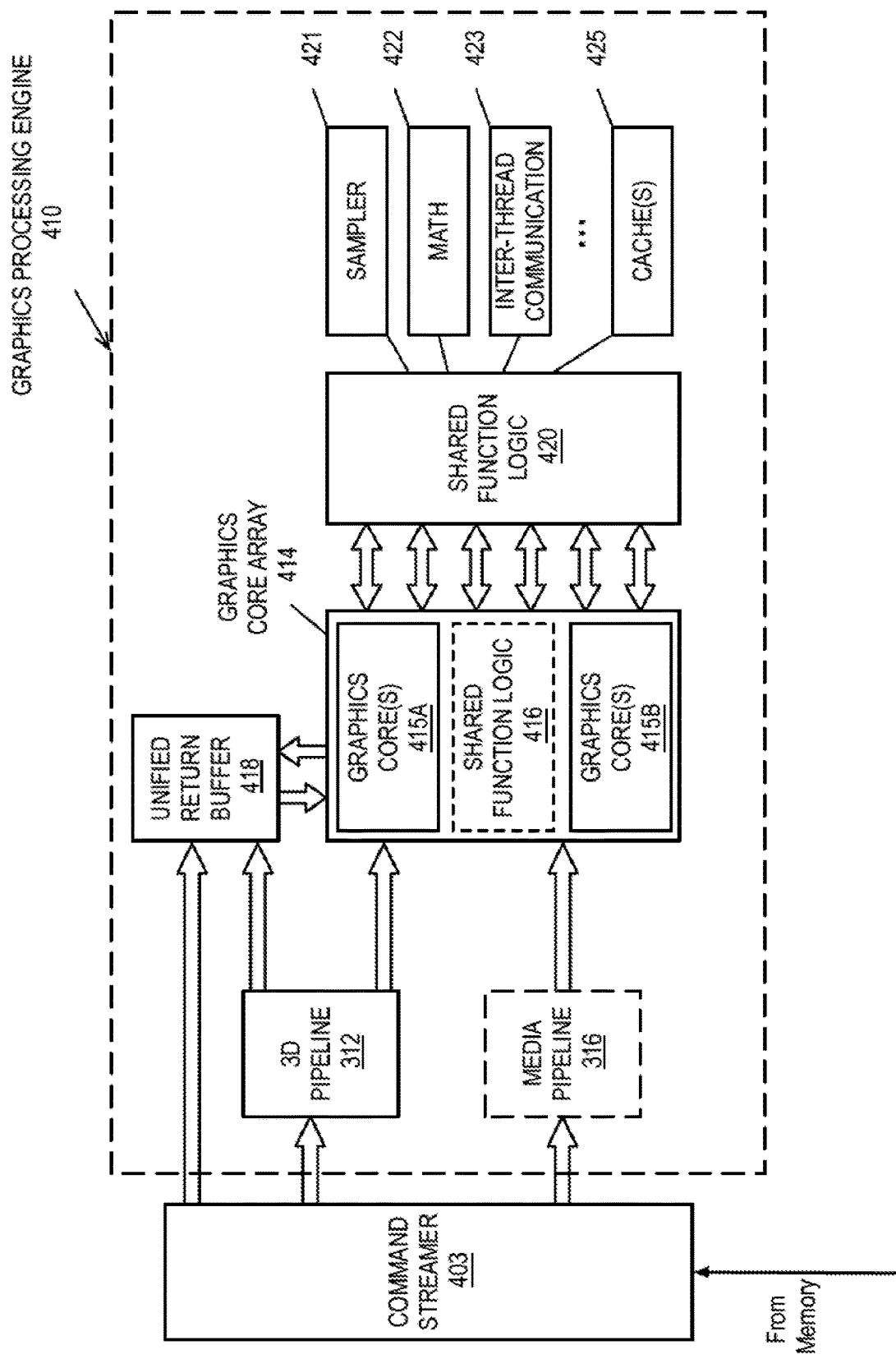
FIG. 4 is a block diagram of a graphics processing engine of a graphics processor in accordance with some embodiments.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example, and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled with memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphics core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled as needed.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
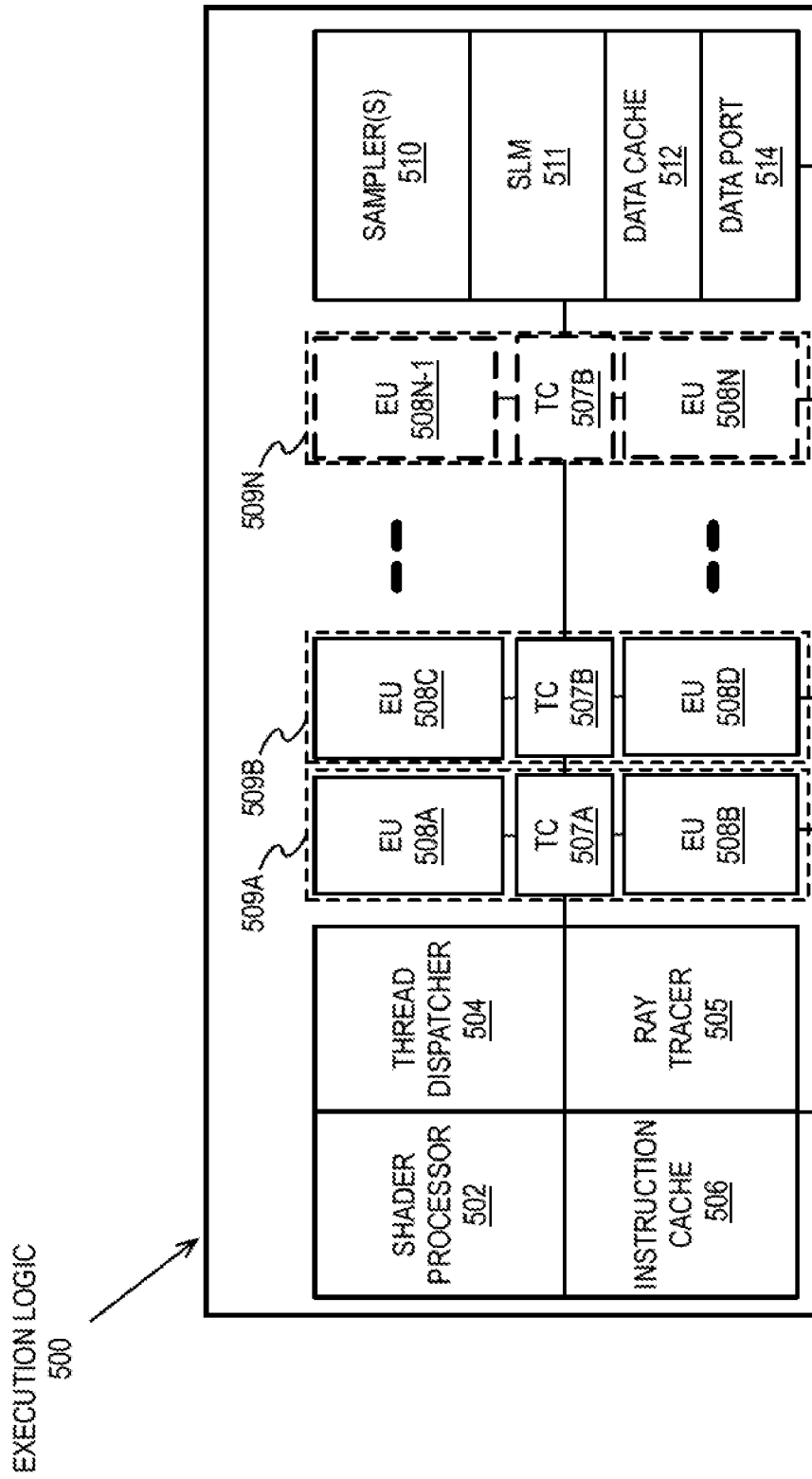
FIG. 5A-5B illustrate thread execution logic including an array of processing elements employed in a graphics processor core according to embodiments described herein.
Figure 5B:
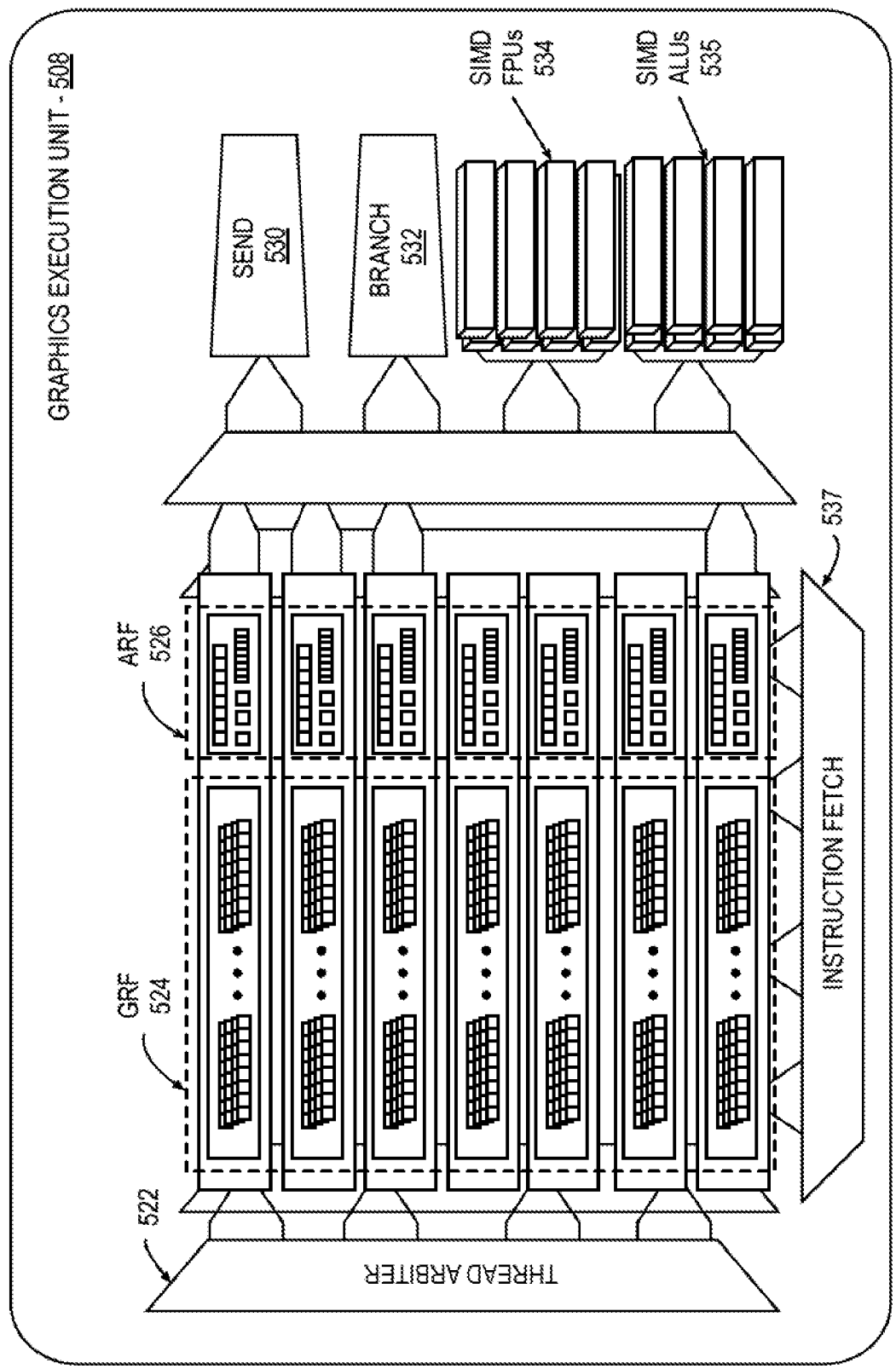

FIG. 5A-5B illustrate thread execution logic 500 including an array of processing elements employed in a graphics processor core according to embodiments described herein. Elements of FIG. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating-Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates exemplary internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
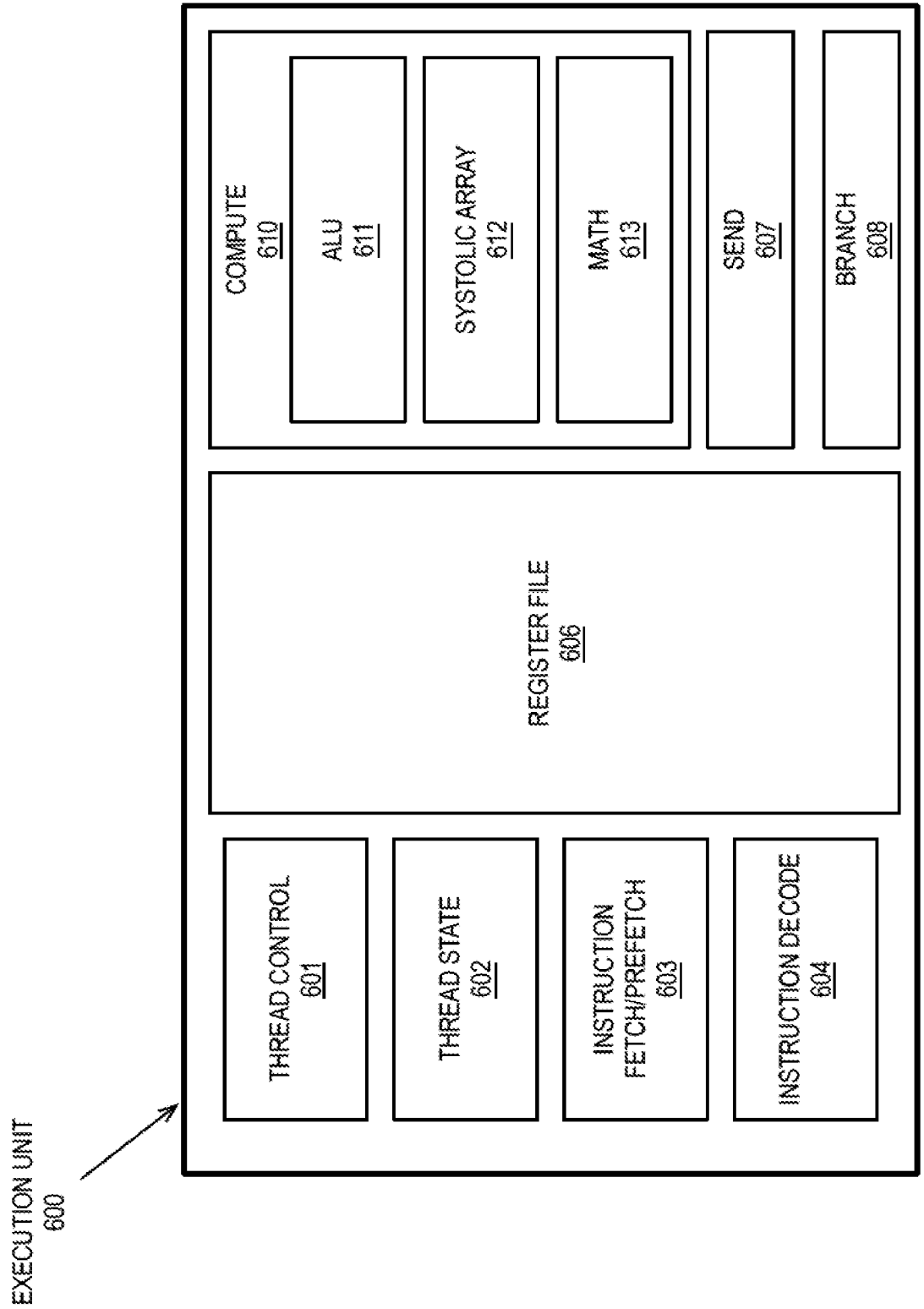
FIG. 6 illustrates an additional execution unit, according to an embodiment.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating-point operations. Integer and floating-point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher-level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

Figure 7:
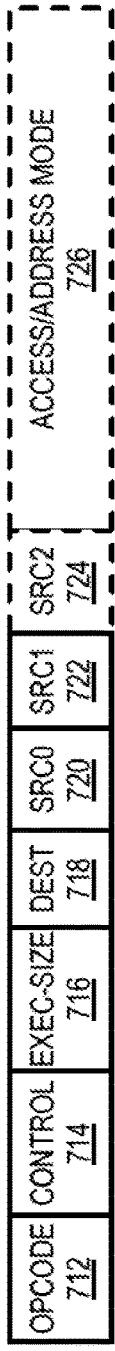
FIG. 7 is a block diagram illustrating graphics processor instruction formats according to some embodiments.
Figure 7:
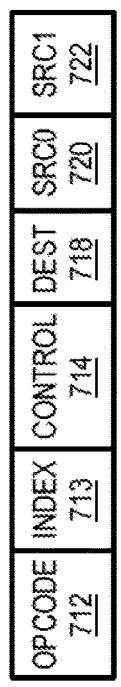
Figure 7:
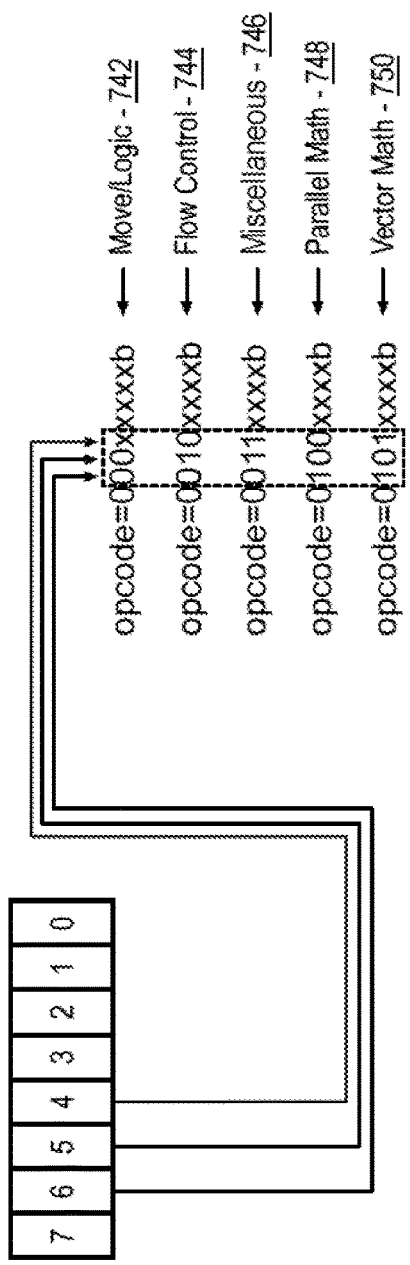

FIG. 7 is a block diagram illustrating graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
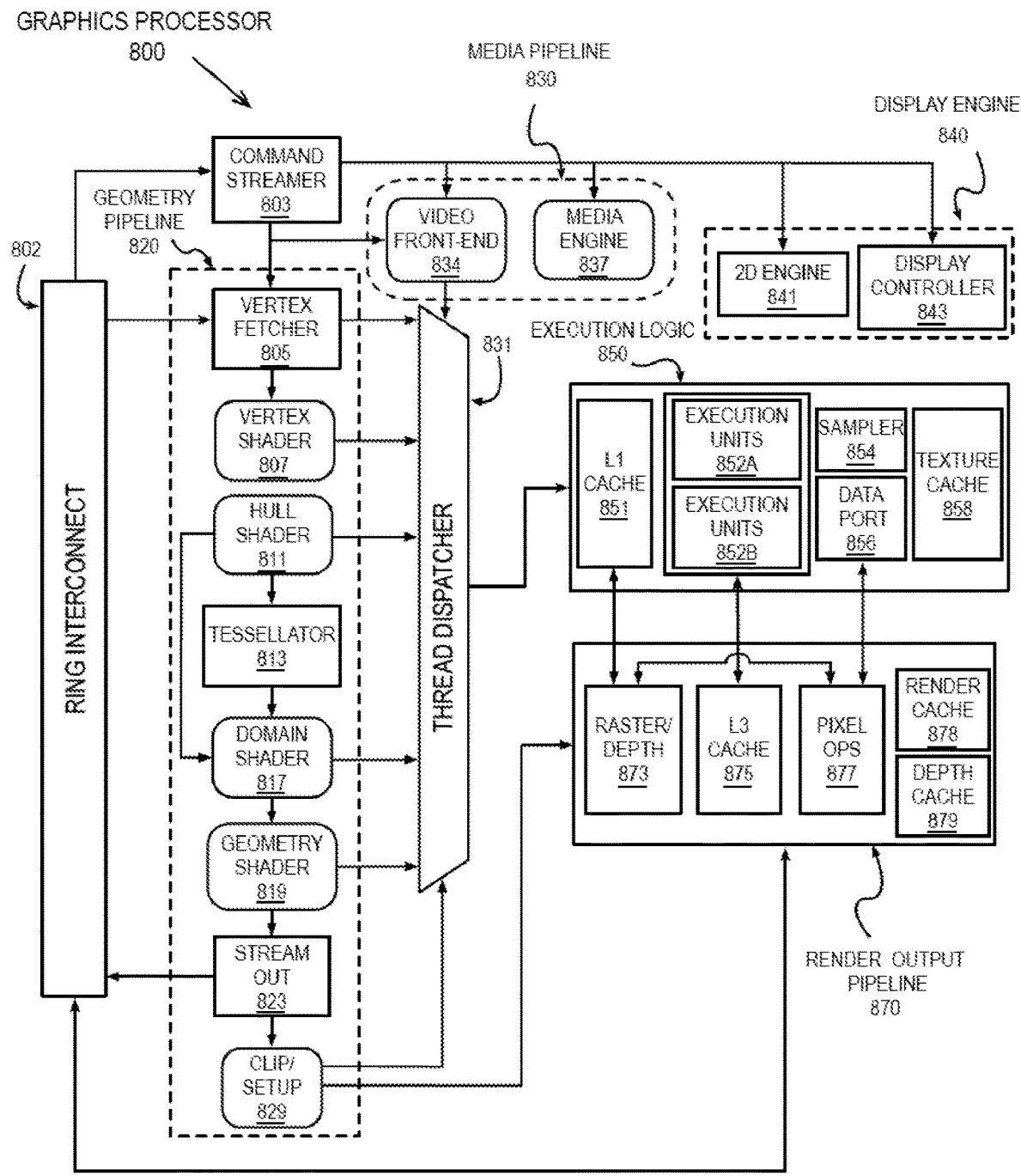
FIG. 8 is a block diagram of a graphics processor according to another embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9A:
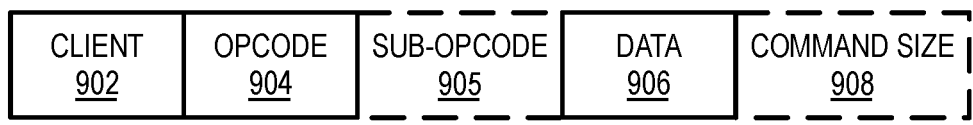
FIG. 9A-9B illustrate a graphics processor command format and command sequence, according to some embodiments.
Figure 9B:
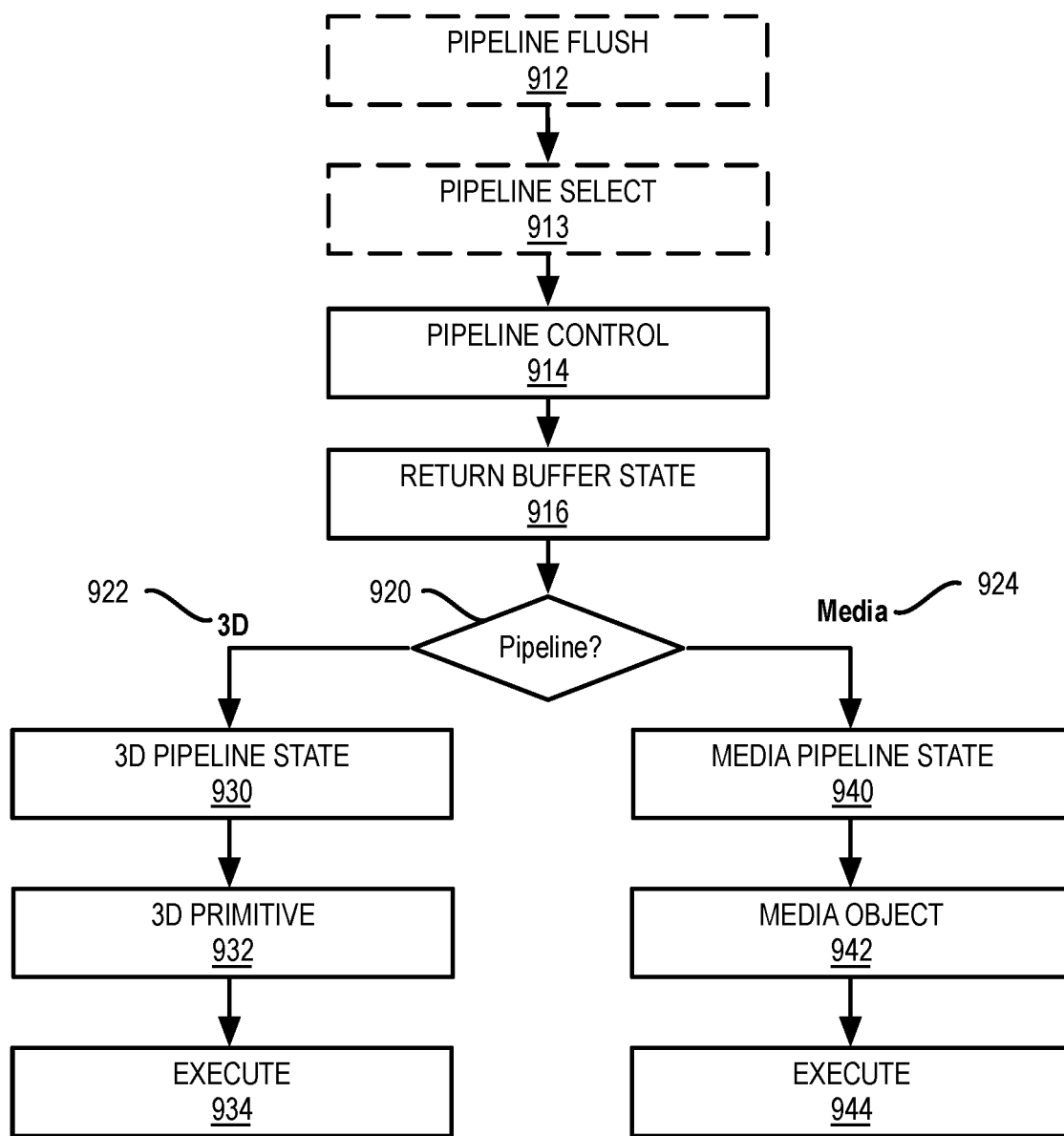

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
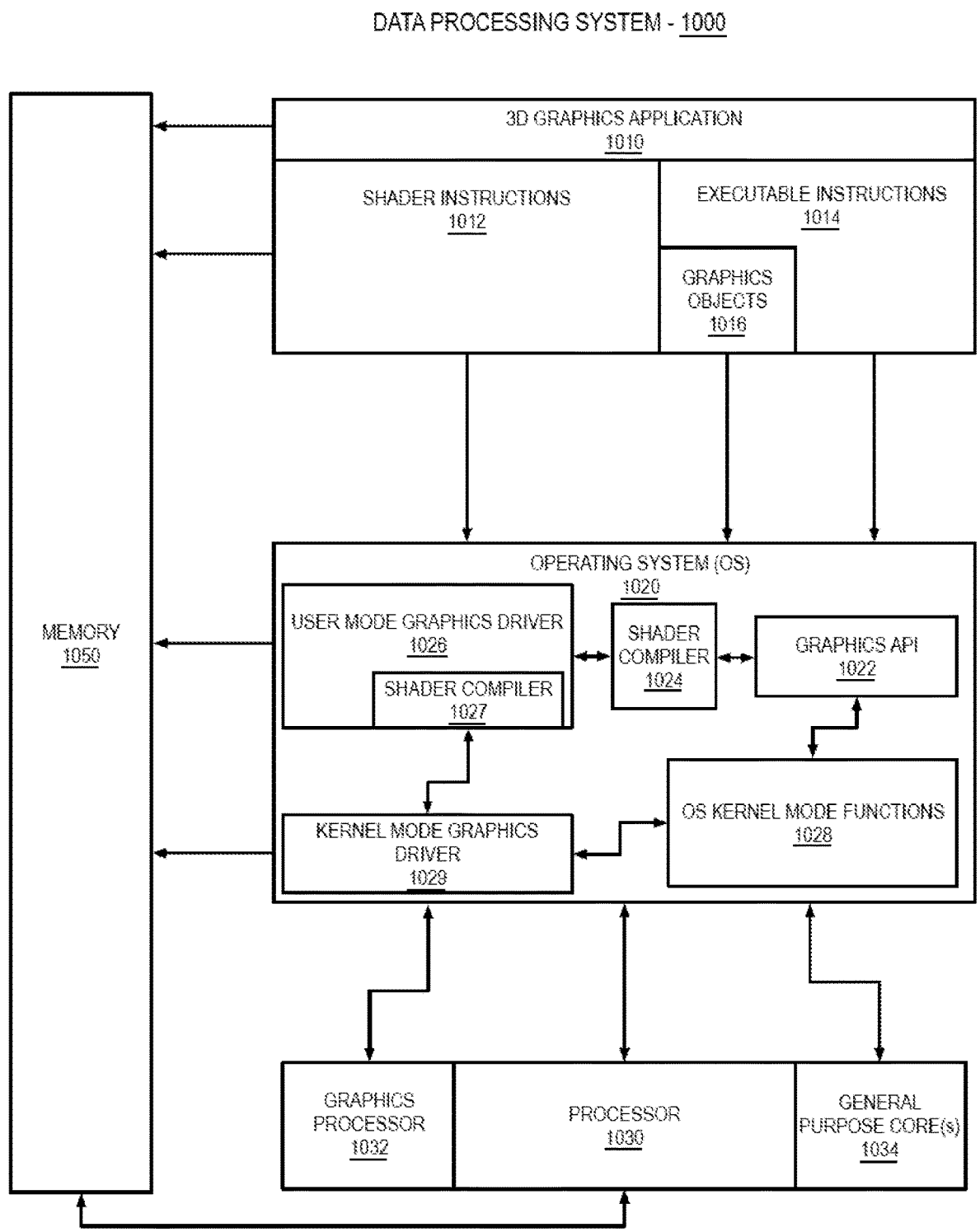
FIG. 10 illustrates exemplary graphics software architecture for a data processing system according to some embodiments.

FIG. 10 illustrates an exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
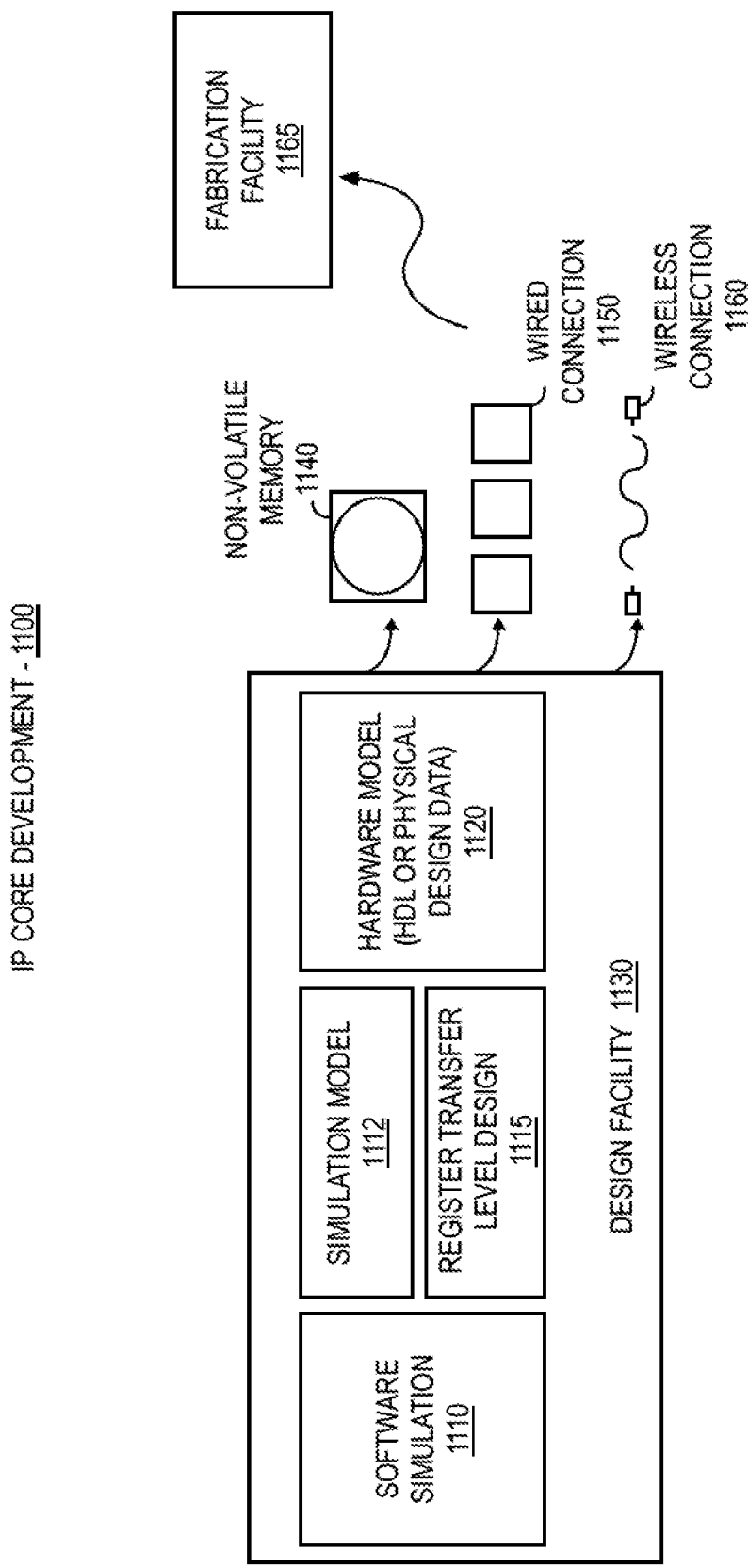
FIG. 11A is a block diagram illustrating an IP core development system, according to an embodiment.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
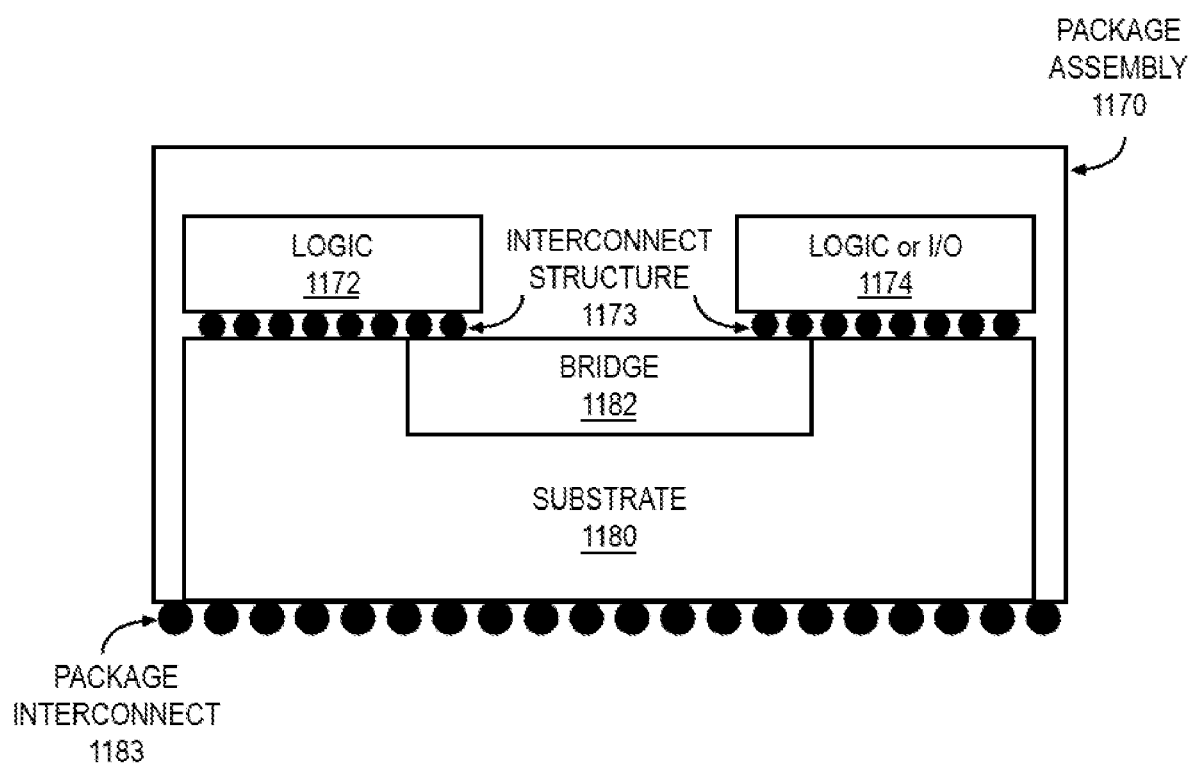
FIG. 11B illustrates a cross-section side view of an integrated circuit package assembly, according to some embodiments described herein.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
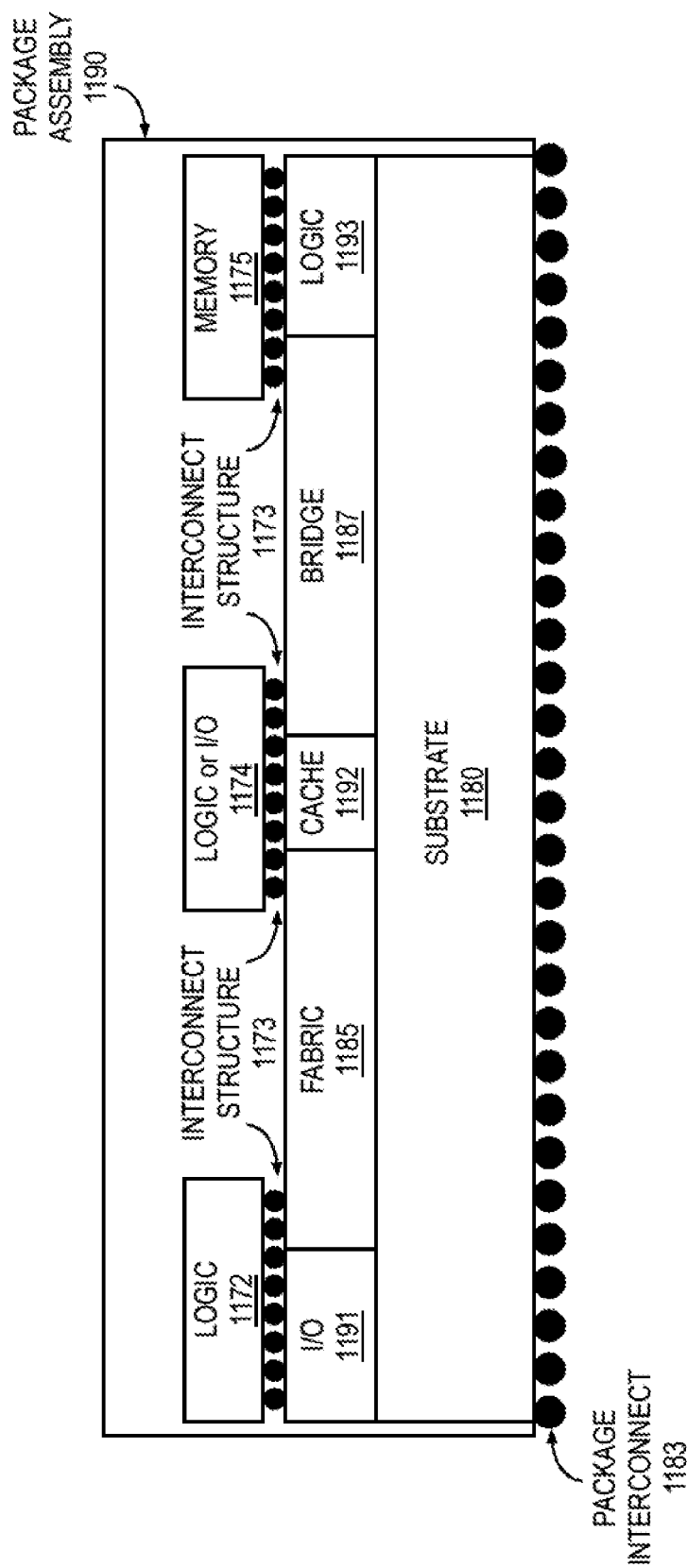
FIG. 11C illustrates a package assembly a includes multiple units of hardware logic chiplets connected to a substrate.

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally, the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (UO)

signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180. The fabric 1185 may be a network on a chip interconnect or another form of packet switched fabric that switches data packets between components of the package assembly.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
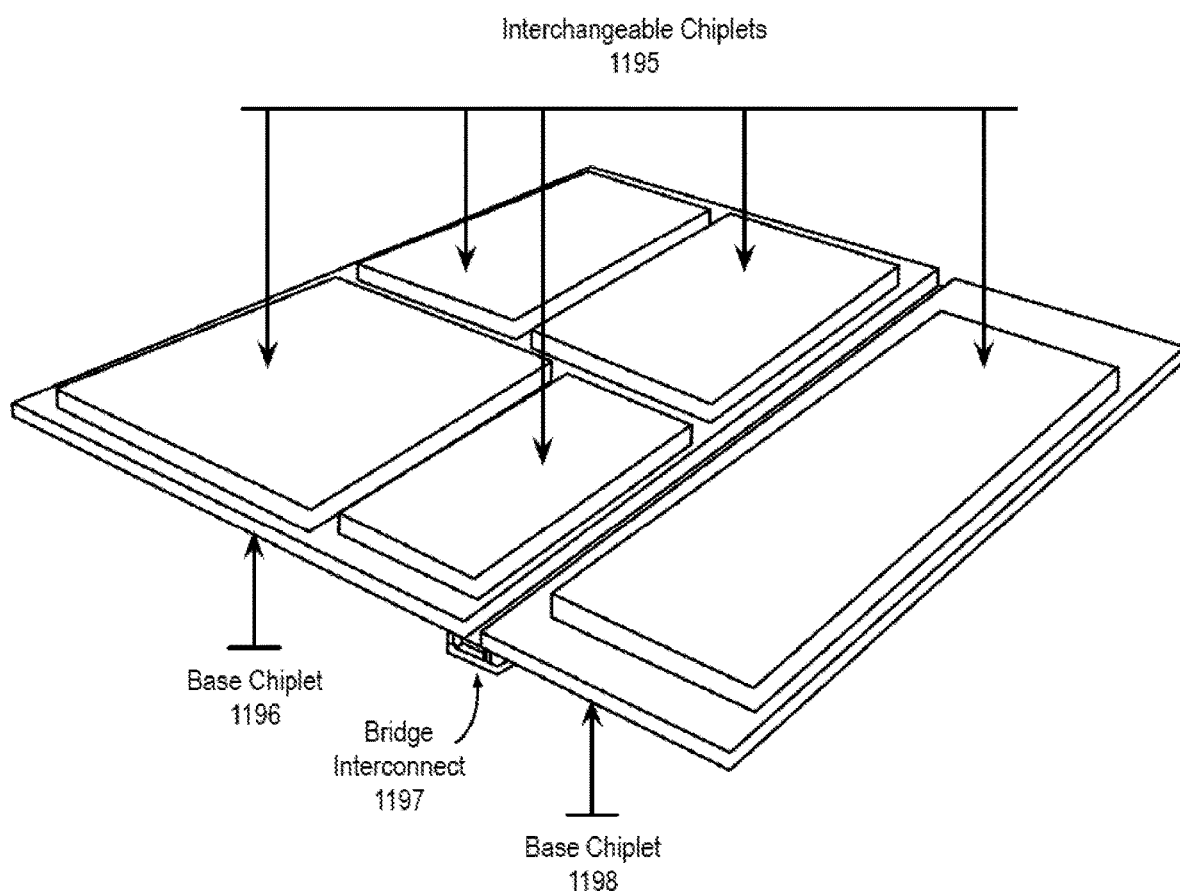
FIG. 11D illustrates a package assembly including interchangeable chiplets, according to an embodiment.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Exemplary System on a Chip Integrated Circuit

Figure 12:
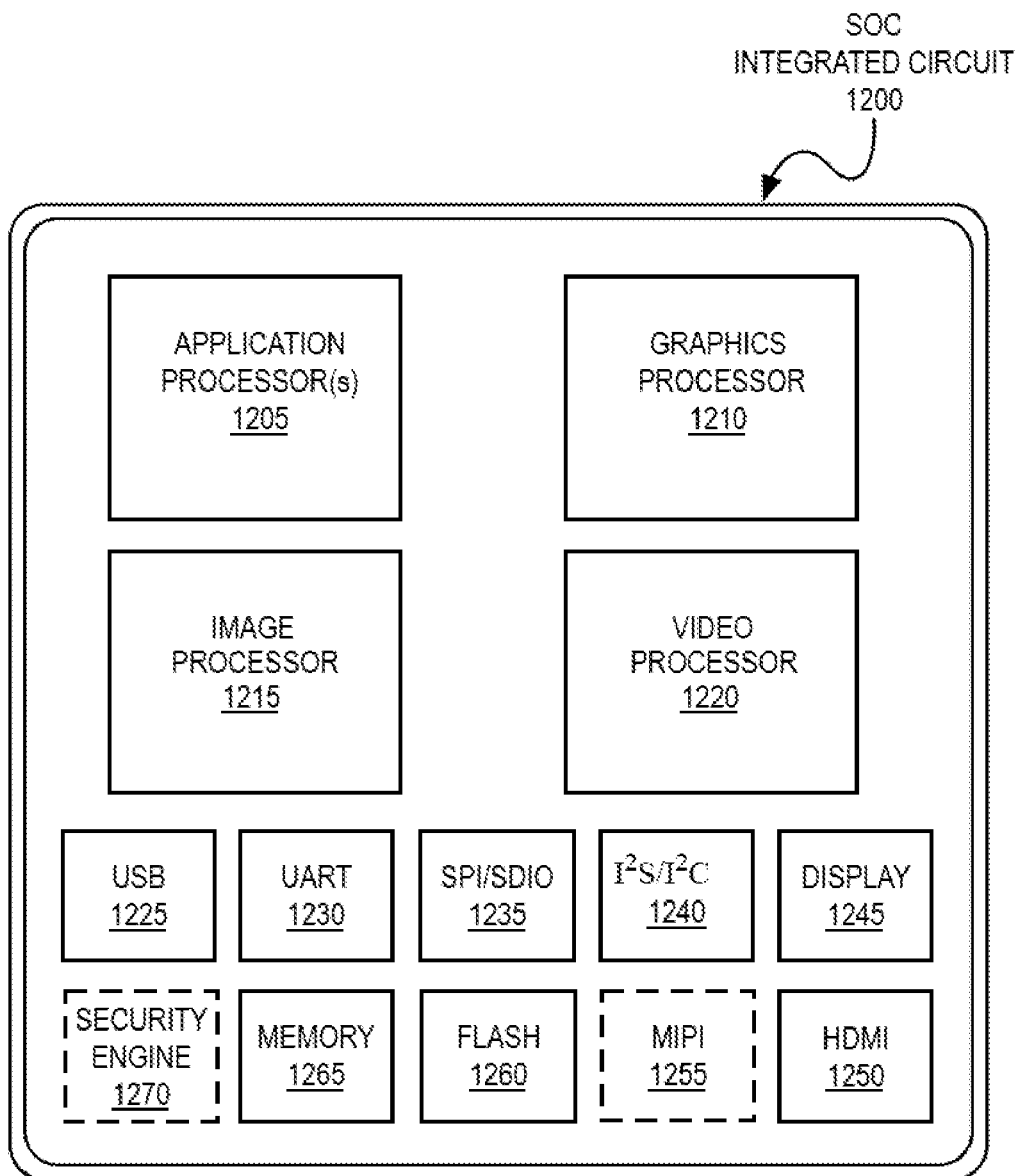
FIG. 12 is a block diagram illustrating an exemplary system on a chip integrated circuit that may be fabricated using one or more IP cores, according to an embodiment.
Figure 13A:
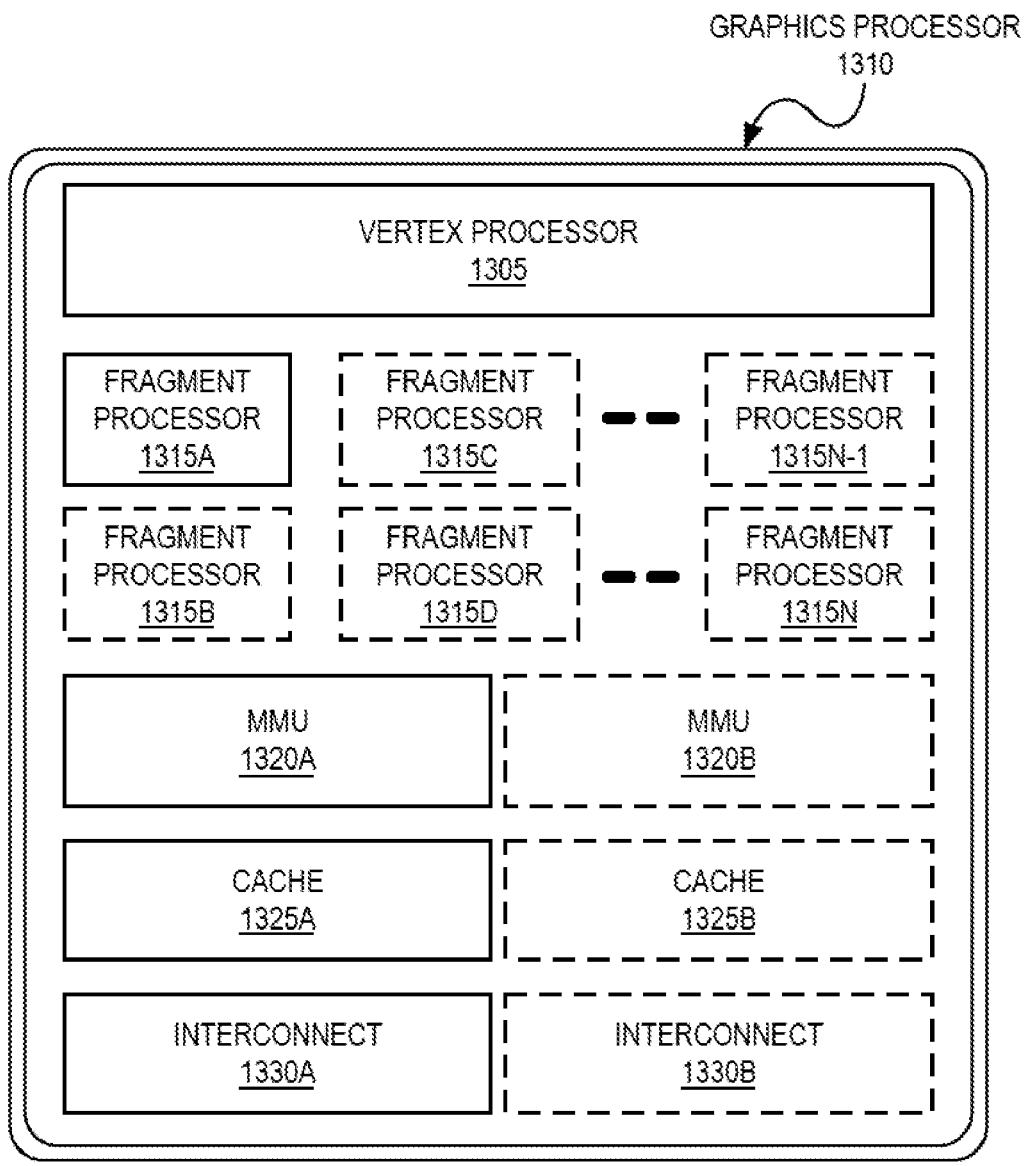
FIG. 13A-13B are block diagrams illustrating exemplary graphics processors for use within an SoC, according to embodiments described herein.
Figure 13B:
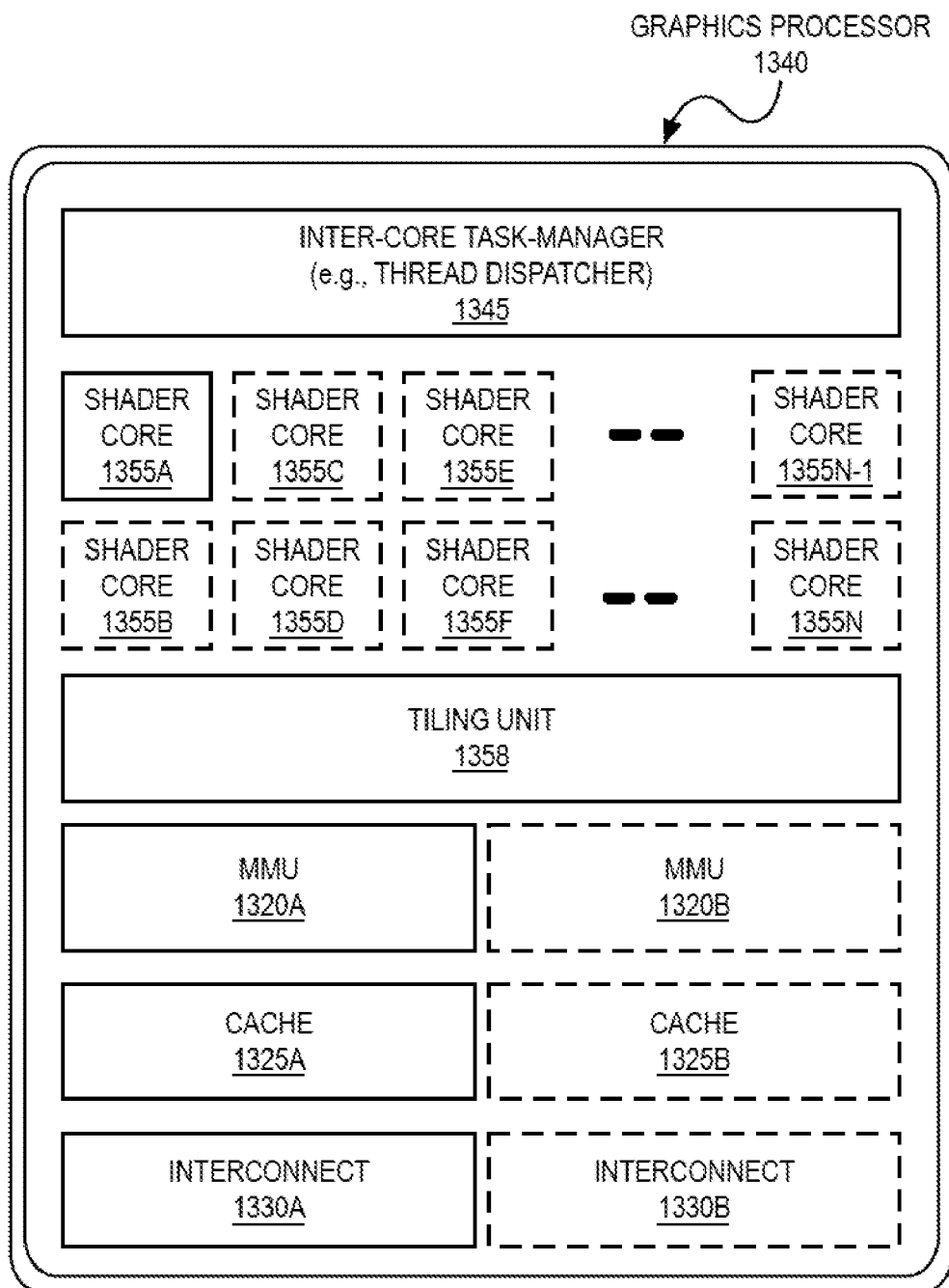

FIG. 12-13B illustrate exemplary integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an exemplary system on a chip integrated circuit 1200 that may be fabricated using one or more IP cores, according to an embodiment. Exemplary integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIG. 13A-13B are block diagrams illustrating exemplary graphics processors for use within an SoC, according to embodiments described herein. FIG. 13A illustrates an exemplary graphics processor 1310 of a system on a chip integrated circuit that may be fabricated using one or more IP cores, according to an embodiment. FIG. 13B illustrates an additional exemplary graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1355A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

Tensor Acceleration Logic for Machine Learning Workloads

Figure 14:
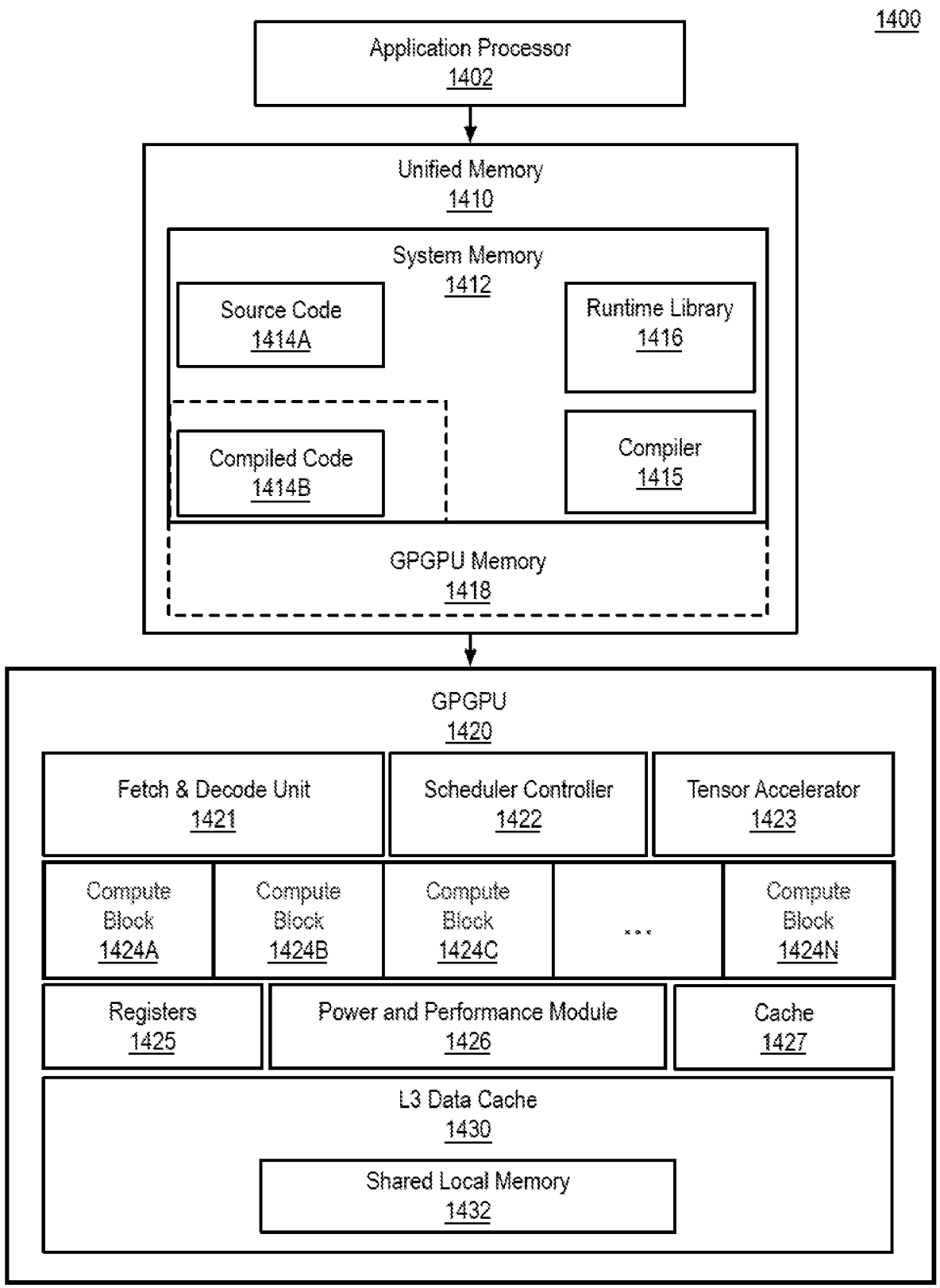
FIG. 14 is a block diagram of a data processing system, according to an embodiment.

FIG. 14 is a block diagram of a data processing system 1400, according to an embodiment. The data processing system 1400 is a heterogeneous processing system having a processor 1402, unified memory 1410, and a GPGPU 1420 including machine learning acceleration logic. The processor 1402 and the GPGPU 1420 can be any of the processors and GPGPU/parallel processors as described herein. The processor 1402 can execute instructions for a compiler 1415 stored in system memory 1412. The compiler 1415 executes on the processor 1402 to compile source code 1414A into compiled code 1414B. The compiled code 1414B can include instructions that may be executed by the processor 1402 and/or instructions that may be executed by the GPGPU 1420. During compilation, the compiler 1415 can perform operations to insert metadata, including hints as to the level of data parallelism present in the compiled code 1414B and/or hints regarding the data locality associated with threads to be dispatched based on the compiled code 1414B. The compiler 1415 can include the information necessary to perform such operations or the operations can be performed with the assistance of a runtime library 1416. The runtime library 1416 can also assist the compiler 1415 in the compilation of the source code 1414A and can also include instructions that are linked at runtime with the compiled code 1414B to facilitate execution of the compiled instructions on the GPGPU 1420.

The unified memory 1410 represents a unified address space that may be accessed by the processor 1402 and the GPGPU 1420. The unified memory can include system memory 1412 as well as GPGPU memory 1418. The GPGPU memory 1418 is memory within an address pace of the GPGPU 1420 and can include some or all of system memory 1412. In one embodiment the GPGPU memory 1418 can also include at least a portion of any memory dedicated for use exclusively by the GPGPU 1420. In one embodiment, compiled code 1414B stored in system memory 1412 can be mapped into GPGPU memory 1418 for access by the GPGPU 1420.

The GPGPU 1420 includes multiple compute blocks 1424A-1424N, which can include one or more of a variety of processing resources described herein. The processing resources can be or include a variety of different computational resources such as, for example, execution units, compute units, streaming multiprocessors, graphics multiprocessors, or multi-core groups. In one embodiment the GPGPU 1420 additionally includes a tensor (e.g., matrix) accelerator 1423, which can include one or more special function compute units that are designed to accelerate a subset of matrix operations (e.g., dot product, etc.). The tensor accelerator 1423 may also be referred to as a tensor accelerator or tensor core. In one embodiment, logic components within the tensor accelerator 1423 may be distributed across the processing resources of the multiple compute blocks 1424A-1424N.

The GPGPU 1420 can also include a set of resources that can be shared by the compute blocks 1424A-1424N and the tensor accelerator 1423, including but not limited to a set of registers 1425, a power and performance module 1426, and a cache 1427. In one embodiment the registers 1425 include directly and indirectly accessible registers, where the indirectly accessible registers are optimized for use by the tensor accelerator 1423. The power and performance module 1426 can be configured to adjust power delivery and clock frequencies for the compute blocks 1424A-1424N to power gate idle components within the compute blocks 1424A-1424N. In various embodiments the cache 1427 can include an instruction cache and/or a lower level data cache.

The GPGPU 1420 can additionally include an L3 data cache 1430, which can be used to cache data accessed from the unified memory 1410 by the tensor accelerator 1423 and/or the compute elements within the compute blocks 1424A-1424N. In one embodiment the L3 data cache 1430 includes shared local memory 1432 that can be shared by the compute elements within the compute blocks 1424A-1424N and the tensor accelerator 1423.

In one embodiment the GPGPU 1420 includes instruction handling logic, such as a fetch and decode unit 1421 and a scheduler controller 1422. The fetch and decode unit 1421 includes a fetch unit and decode unit to fetch and decode instructions for execution by one or more of the compute blocks 1424A-1424N or the tensor accelerator 1423. The instructions can be scheduled to the appropriate functional unit within the compute block 1424A-1424N or the tensor accelerator via the scheduler controller 1422. In one embodiment the scheduler controller 1422 is an ASIC configurable to perform advanced scheduling operations. In one embodiment the scheduler controller 1422 is a micro-controller or a low energy-per-instruction processing core capable of executing scheduler instructions loaded from a firmware module.

In one embodiment some functions to be performed by the compute blocks 1424A-1424N can be directly scheduled to or offloaded to the tensor accelerator 1423. In various embodiments the tensor accelerator 1423 includes processing element logic configured to efficiently perform matrix compute operations, such as multiply and add operations and dot product operations used by 3D graphics or compute shader programs. In one embodiment the tensor accelerator 1423 can be configured to accelerate operations used by machine learning frameworks. In one embodiment the tensor accelerator 1423 is an application specific integrated circuit explicitly configured to perform a specific set of parallel matrix multiplication and/or addition operations. In one embodiment the tensor accelerator 1423 is a field programmable gate array (FPGA) that provides fixed function logic that can updated between workloads. The set of matrix operations that can be performed by the tensor accelerator 1423 may be limited relative to the operations that can be performed by the compute block 1424A-1424N. However, the tensor accelerator 1423 can perform those the operations at a significantly higher throughput relative to the compute block 1424A-1424N.

Figure 15:
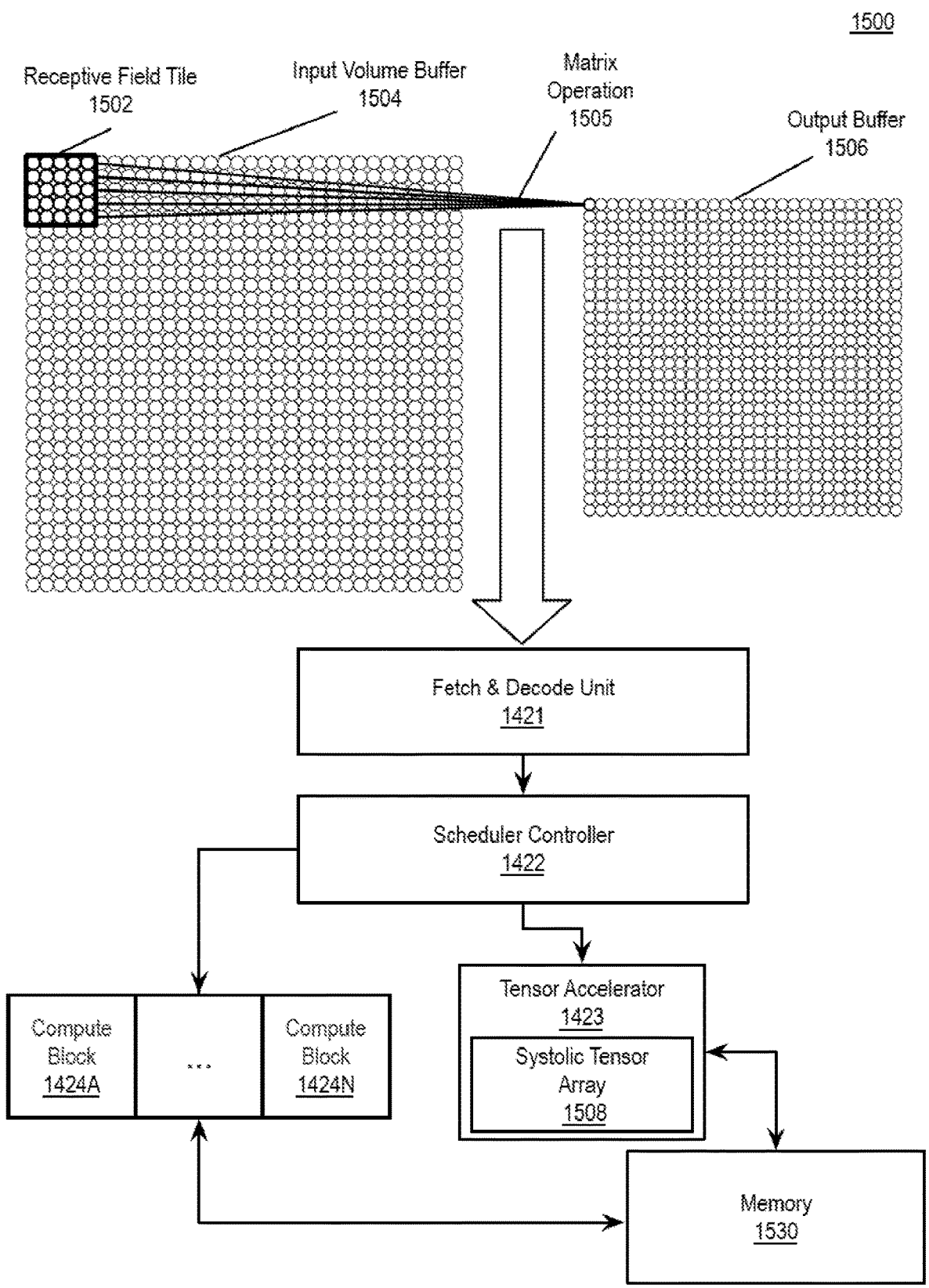
FIG. 15 illustrates a matrix operation performed by an instruction pipeline, according to an embodiment.

FIG. 15 illustrates a matrix operation 1505 performed by an instruction pipeline 1500, according to an embodiment. The instruction pipeline 1500 can be configured to perform a matrix operation 1505, such as, but not limited to a dot product operation. The dot product of two vectors is a scalar value that is equal to sum of products of corresponding components of the vectors. The dot product can be calculated as shown in equation (1) below.

$$\vec{a} \cdot \vec{b} = \sum_{i=1}^{n} a_i b_i = a_1 b_1 + \ldots + a_n b_n \quad (1)$$

The dot product can be used in a convolution operation for a convolutional neural network (CNN). FIG. 15 illustrates a two-dimensional (2D) convolution using a matrix operation 1505 including a dot product operation. While 2D convolution is illustrated, N-dimensional convolution can be performed on an N-dimensional volume using N-dimensional filters. A receptive field tile 1502 highlights a portion of an input volume in an input volume buffer 1504. The input volume buffer can be stored in memory 1530. A dot product matrix operation 1505 can be performed between the data within the receptive field tile 1502 and a convolutional filter to generate a data point within output buffer 1506, which can also be stored in memory 1530. The memory 1530 can be any of the memory described herein, including system memory 1412, GPGPU memory 1418, or one or more cache memories 1427, 1430 as in FIG. 14.

The combination of the data points within the output buffer 1506 represents an activation map generated by the convolution operation. Each point within the activation map is generated by sliding the receptive field tile across the input volume buffer 1504. The activation map data can be input to an activation function to determine an output activation value. In one embodiment, convolution of the input volume buffer 1504 can be defined within a framework as high-level matrix operation 1505. The high-level matrix operations can be performed via primitive operations, such as a basic linear algebra subprogram (BLAS) operation. The primitive operations can be accelerated via hardware instructions executed by the instruction pipeline 1500.

The instruction pipeline 1500 used to accelerate hardware instructions can include the instruction fetch and decode unit 1421, which can fetch and decode hardware instructions, and the scheduler controller 1422 which can schedule decoded instructions to one or more processing resources within the compute blocks 1424A-1424N and/or the tensor accelerator 1423. In one embodiment, a hardware instruction can be scheduled to the compute blocks 1424A-1424N and offloaded to the tensor accelerator 1423. The one or more hardware instructions and associated data to perform the matrix operation 1505 can be stored in the memory 1530. Output of the hardware instruction can also be stored in the memory 1530.

In one embodiment, the tensor accelerator 1423 can execute one or more hardware instructions to perform the matrix operation 1505 using an integrated systolic array 1508 (DP logic). The systolic array 1508 can include a combination of programmable and fixed function hardware that is configurable to perform dot product operations. While functional units within the compute blocks 1424A-1424N can also be configured to perform dot product operations, the systolic array 1508 can be configured to perform a limited subset of dot product operations at a significantly higher throughput relative to the compute block 1424A-1424N.

Scalable Sparse Matrix Multiply Acceleration Using Systolic Arrays with Feedback Inputs Described herein is an architecture to enable scalable sparse matrix multiply acceleration using systolic arrays with feedback inputs. The architecture accelerates systolic matrix multiplication in workloads whose data exhibits a high number of zeroes. This architecture is easily scalable, preserving the gains given by the optimizations introduced to take advantage of the sparsity found in the workload's data, and allowing incrementing the instructions throughput. Advantages include reduced area, reduced power consumption, and increased performance relative to other systolic arrays. This architecture improves performance of systolic dot product accumulate operations by reducing the number of computations in highly sparse data loads. The reduction of computations results in a reduction of power consumption when compared with previous architectures. This architecture also scales better than existing systolic arrays by simplifying the design of the systolic array. The simplified design enables the architecture to be widely incorporated in accelerator designs to increase the matrix processing throughput of those accelerators.

Data used in computations of machine learning algorithms exhibit a high number of zeros as input elements. In neural network applications, this is naturally caused by the topology of the implemented network and the characteristics of the modeled neurons. As an example, in a fully interconnected neural network, the outputs of a column or layer of neurons are connected to an input of each neuron in the next layer. A network is composed of many layers, each one possibly featuring a large number of neurons. The last stage in the computation of the output of a neuron is executing the activation function. This function usually outputs the evaluation of a positive function when the computations of the neuron's inputs is positive, and outputs zero when they are negative. Due to that, a large number of the output results of a neuron can be zeroes, and in a following step in the computation of the neural network, fed to the next network layer.

In the execution of a neural network featuring a large number of layers and neurons, each layer is represented by a matrix of the values of the input's weights of the neurons and a matrix of the values of the inputs to the neurons. All the inputs to a neuron are multiplied by its weight and added to the result of the other inputs to the neuron. After that, the activation function is applied to obtain the output of the neuron which feds the next network layer. To fast compute the multiplication and addition of the inputs and weight of the neurons, several techniques have been used in hardware. The one that pertains to this invention is the use of systolic arrays for multiply and accumulate operations.

Figure 16:
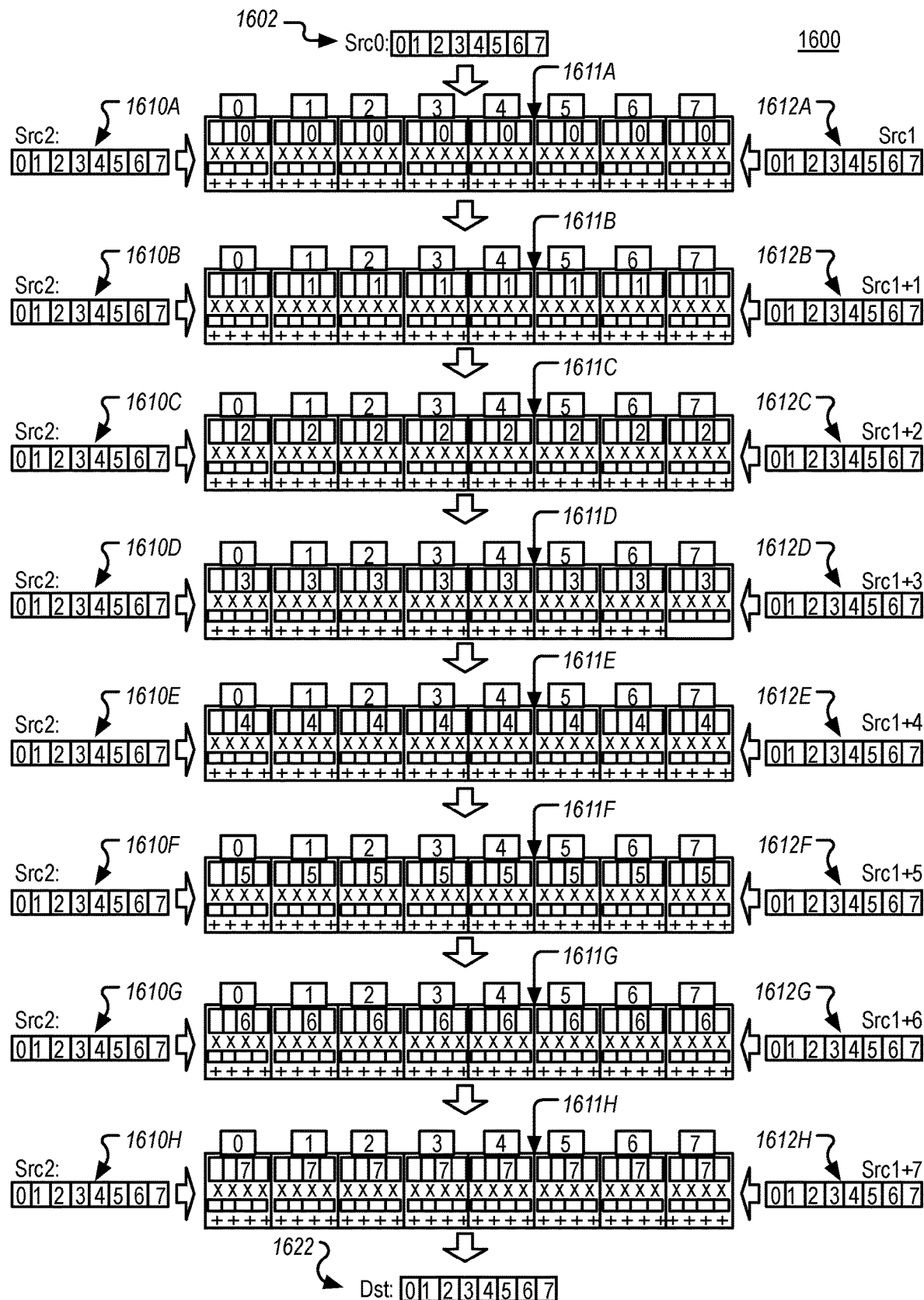
FIG. 16 illustrates a systolic array of multiplier/adder circuits organized in a pipelined fashion.

FIG. 16 illustrates a systolic array 1600 including multiplier and adder circuits organized in a pipelined fashion. Inputs 1612A-1612H for the first input matrix are represented by the data elements contained in the inputs labeled Src1 and Src1+1 through Src1+7. Inputs 1610A-1610B correspond to the second input matrix and are labeled as Src2. Input 1602, which may include initial accumulator values, can be provided as Src0. Processing elements 1611A-1611H of the systolic array 1600 operate as a pipelined structure and each stage is executed in a clock cycle. On every cycle, every stage can receive a new src2 input which can be computed with a new Src1 input or an older one. A Src2 input operates with eight Src1 inputs (e.g., one Src1 input per stage). The data elements of a channel of the Src2 input are broadcast across all channels of processing elements 1611A-1611H. The processing elements then operate the Src2 channel with all channels of a Src1 input. In a first clock cycle, a Src1 input is operated with data elements of the first channel of Src2. In the next cycle, a second Src1 (labeled as Src1+1) operates with the data elements of the second channel of Src2. This sequence repeats on the 8 stages of the pipeline. Each stage adds its operation to the output of the previous stage. Across the pipeline stages, multiple Src2 inputs are operated in a pipelined fashion. As successive channels of a first Src2 input are pushed through the pipeline stages, a new Src2 input can be provided at the first stage.

Output 1622 from the final stage is labeled as Dst. Where d=the systolic depth and e=the number of data elements per channel, the output of a channel is described by equation (2) below:

$$Dst_i = Src0_i + \sum_{j=0}^{d} \sum_{k=0}^{e} (Src1 + j)_{\text{element } k \text{ of channel } i} * Src2_{\text{element } k \text{ of channel } j} \quad (2)$$

As shown in equation (2), each channel can include multiple data elements on which operations are performed in parallel. In one embodiment, each channel represents a four element data vector, although a different number of elements can be configured for each channel. In one embodiment, the number of data elements within a channel can vary based on the size of each data element. Dot products can be performed using, for example, four element vectors with 8-bit data types per element, two element vectors with 16-bit data types, eight element vectors with 4-bit data types (e.g., INT4), or 16 element vectors with 2-bit data types (e.g., INT2). The number of channels can be automatically adjusted depending on the datatype of Src1 and Src2. An instruction can also specify a required systolic depth to be used for the instruction.

In one embodiment the processing elements 1611A-1611H may read inputs 1610A-1610H, 1612A-1612H directly from the general-purpose register file. In one embodiment systolic array 1600 includes logic to read inputs 1610A-1610H, 1612A-1612H from the general purpose register file and store input data in registers, buffers, or memory that is internal to the systolic array. Internal logic can then feed the input data elements to the processing elements 1611A-1611H for processing. Output 1622 can be written to internal registers or memory of the systolic array 1600 and/or written directly to the general-purpose register file.

In one embodiment, when the elements that input to a multiplier/adder in a stage are determined to be zero, the multiplication/addition can be bypassed and only the previous input is propagated. When an input matrix is sparse (e.g., contains a high number of zeroes), the number of operations to be performed is reduced. Some implementations may bypass the multiply/accumulate stages to avoiding spending power doing the multiply/add operation. However, simply bypassing an operation results in idle stages in the systolic chain. For example, if an element of a Src2 input are all zeroes, bypassing that stage associated with that element will save power. However, no operations will be done in that cycle. Thus, the throughput of the operations will remain unimproved. Other implementations may rearrange the inputs in such way that entire sections of the array can be bypassed. Rearranging the input increases the scale-up cost due to the addition of extra hardware to rearrange the inputs. The architecture has to consider cases of inputs with no sparsity, which will require using the full depth of the pipeline. Thus, the architecture should be designed with all the stages always available.

Described herein, in various embodiments, are architectures with optimizations to handle sparse inputs in a manner while avoiding the above issues. Embodiments provide for a modular systolic array that can be easily scalable to fulfill the needs of different products and allow the computation of only non-zero elements without additional hardware or idle clock cycles. These concepts are incrementally described in the next sections of this specification.

A Matrix Multiply Accelerator with Feedback Inputs

Systolic array 1600 is an eight deep multiply/add array with accumulations and may be referred to as a DPAS (Dot Product Accumulate Systolic) array. The depth of such architecture is beneficial to some products, projects, and/or use cases. Other products, projects, and/or use cases might not have the need for an array of that depth and would benefit from having an array with lower throughput, but smaller area and/or lower power consumption. Alternatively, other products, projects, and/or use cases might benefit from a higher DPAS throughput achievable by using a higher pipeline depth. To reduce the amount of hardware used in a systolic array while conserving the same programming model that is used for deeper arrays, feedback inputs are added to a reduced depth version of the systolic arrays shown in FIG. 16.

Figure 17A:
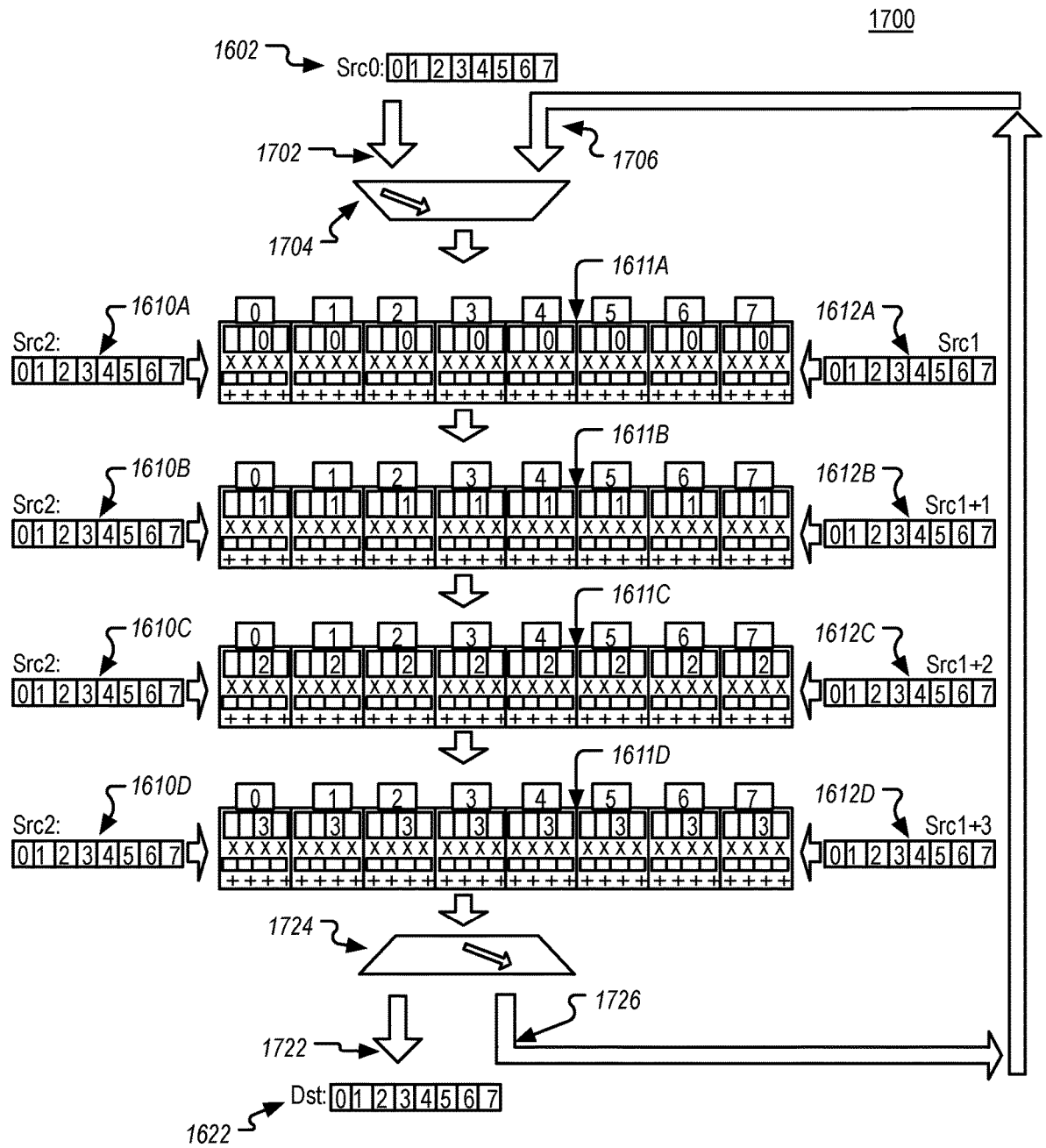
FIG. 17A-17B illustrates the use of a four-deep systolic array to compute an equivalent array of eight systolic stages.
Figure 17B:
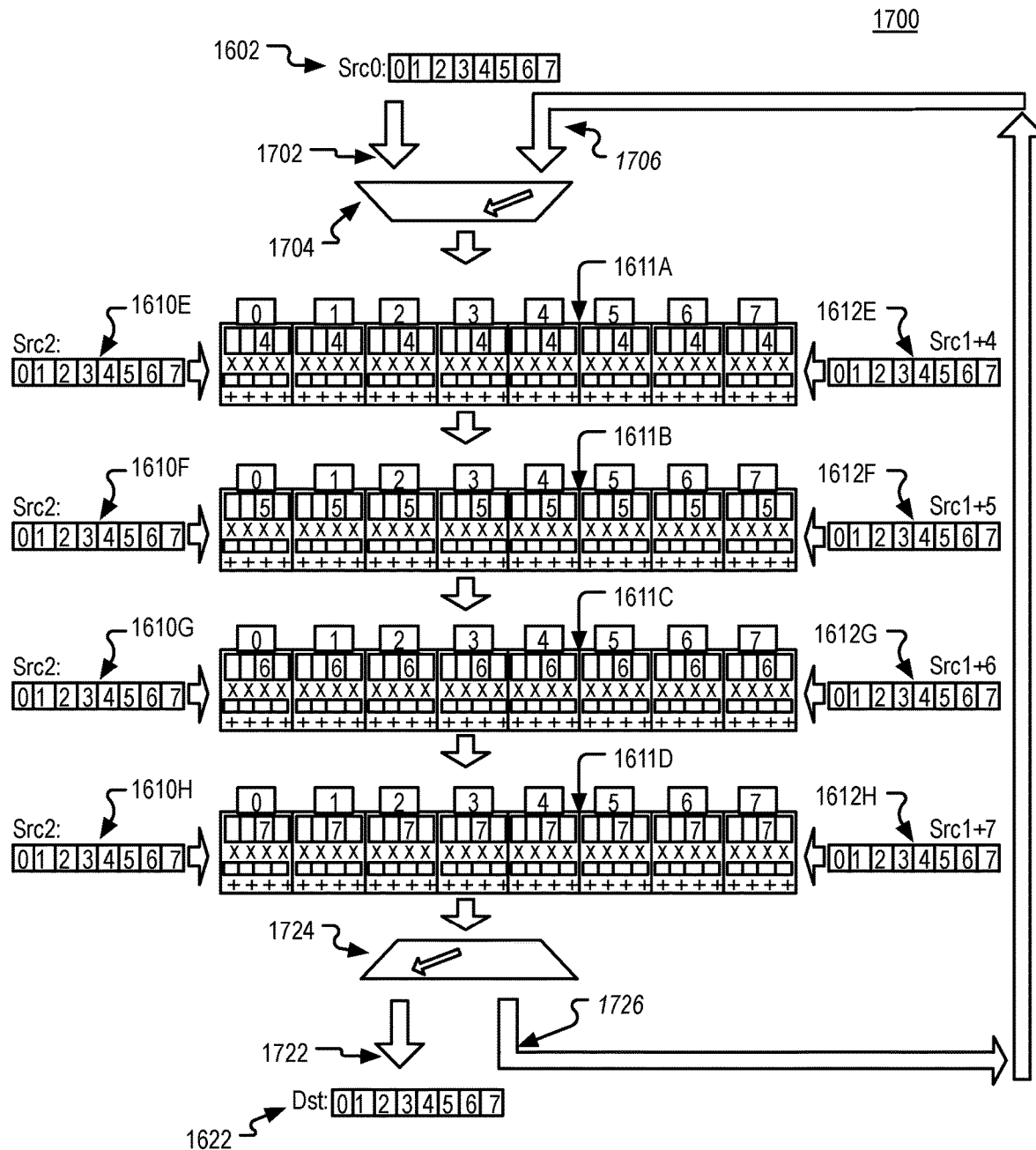

FIG. 17A-17B illustrates the use of a four-deep systolic array 1700 to compute an equivalent array of eight systolic stages. FIG. 17A shows the array receiving Src0 inputs from an external source and processing the first four stages with Src1 and Src2 inputs. The output of this array is fed back into the second step shown in FIG. 17B. FIG. 17B shows that the next four stages are calculated using the feedback data that includes the already processed values and the Src1 and Src2 inputs.

As shown in FIG. 17A, systolic array 1700 can accept input 1602, as Src0 input, which is read (1702) via data selector 1704. Data selector 1704 selects between the input 1602 and feedback input 1706. Processing elements 1611A-1611D can process inputs 1610A-1610D and 1612A-1612D in a similar manner as systolic array 1600. If four stages are sufficient to complete an operation, processing element 1611D can write (1722) output 1622 to a specified Dst register or memory via data selector 1724. Where further stages are required, data selector 1724 can write feedback output 1726, which is provided as feedback input 1706 to processing element 1611A.

As shown in FIG. 17B, in one embodiment feedback input 1706 can be further processed by processing elements 1611A-1611D. Feedback input 1706 includes the already processed values. In one embodiment, feedback input 1706 can also include input 1610E-1610H, input 1612E-1612H, which can be pre-fetched while processing the first four stages. Data selector 1704 select feedback input 1706 for input by processing element 1611A. Processing elements 1611A-1611D can then process inputs 1610E-1610H and 1612E-1612H. Data selector 1724 can then write (1722) the eighth stage result as output 1622 to the specified Dst register.

Figure 18A:
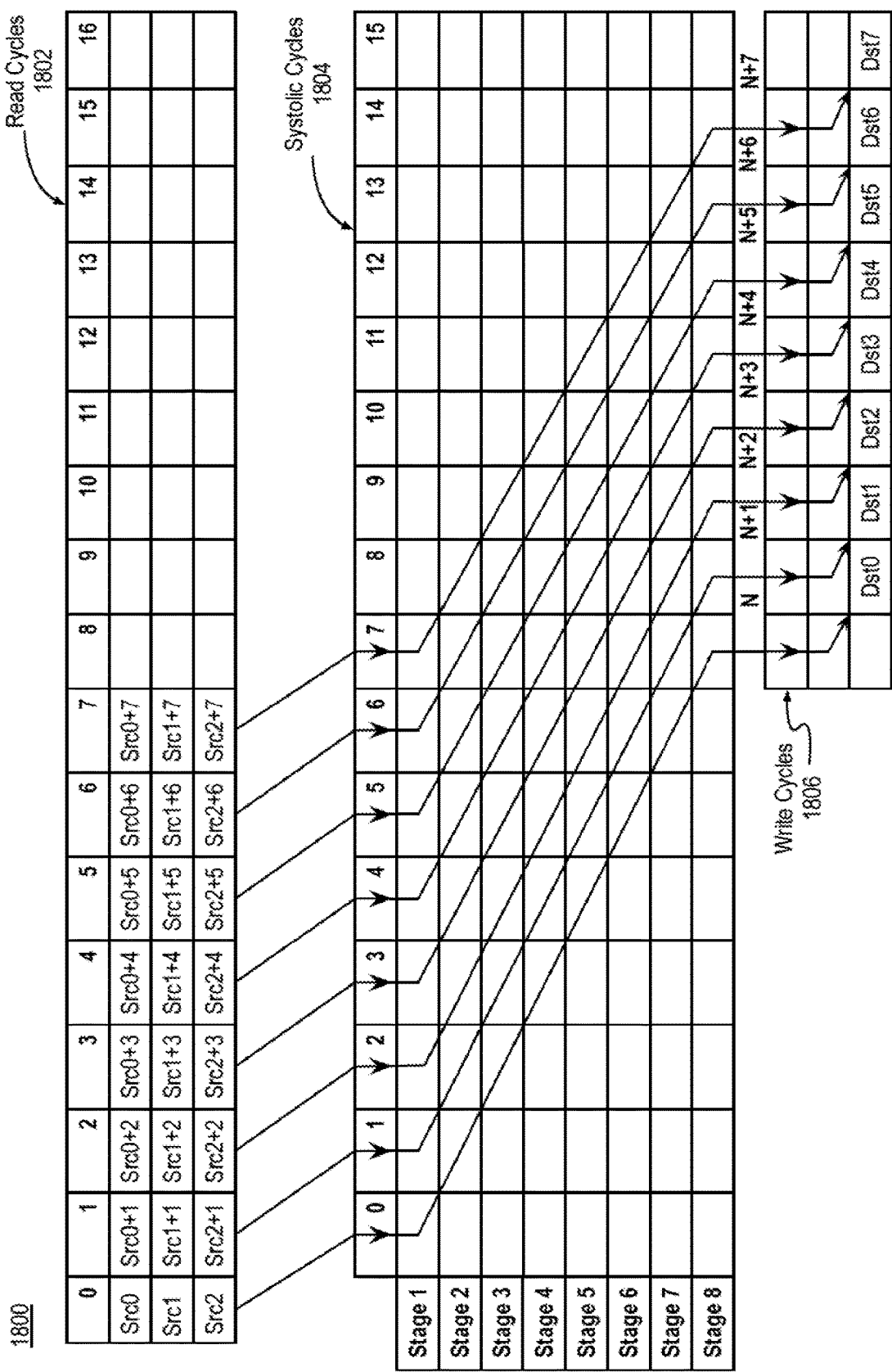
FIG. 18A-18B show time diagrams of systolic architectures.
Figure 18B:
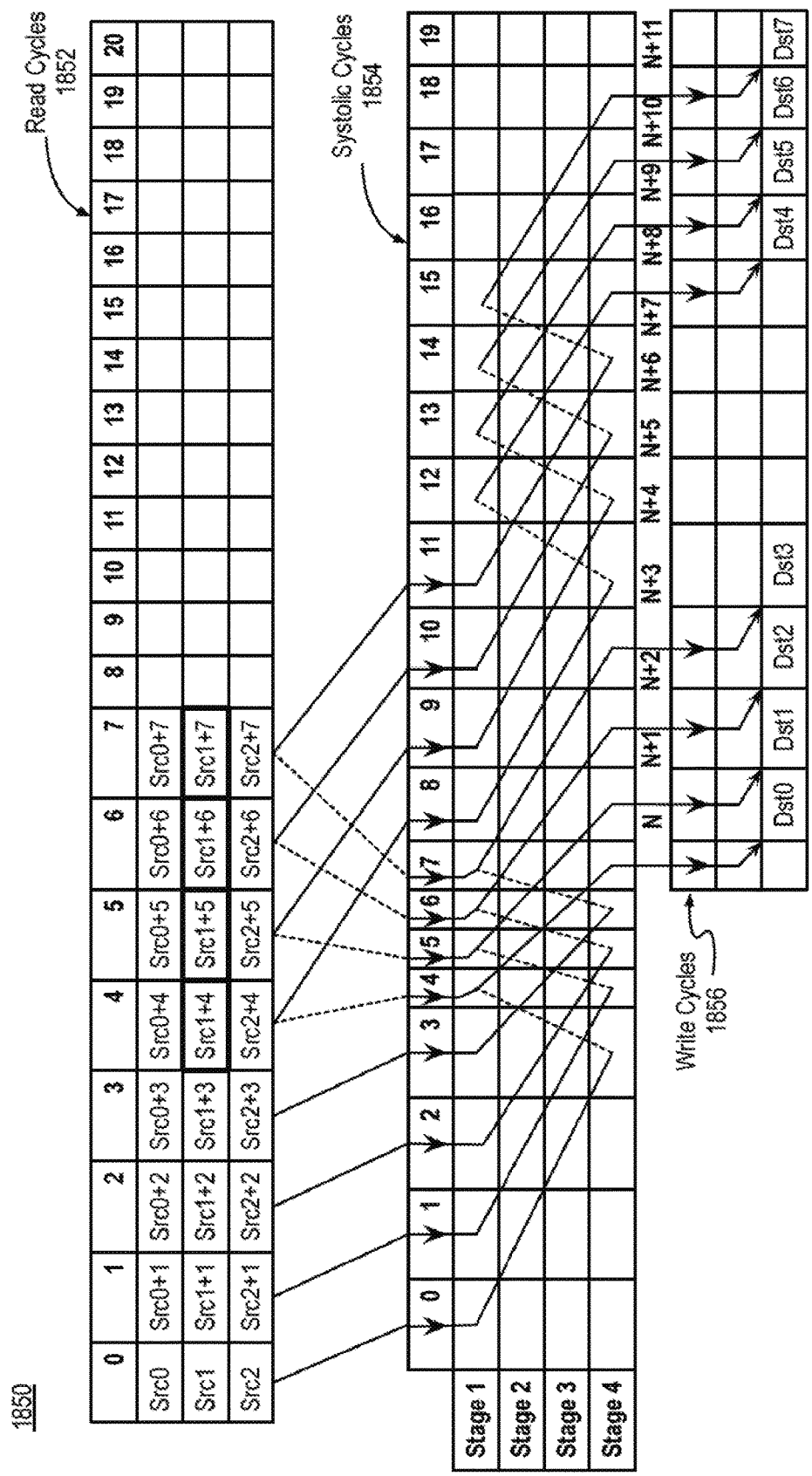

Time diagrams of the arrays of FIG. 16 and FIG. 17A-17B are shown in FIG. 18A-18B.

FIG. 18A-18B show two timing diagrams 1800, 1850. FIG. 18A shows a timing diagram 1800 that corresponds to the 8-deep systolic array 1600 depicted in FIG. 16. FIG. 18B shows a time diagram 1850 that corresponds to the systolic array with feedback inputs depicted in FIG. 17A-17B. Multiple clock cycles are shown.

As shown in FIG. 18A, timing diagram 1800 shows read cycles 1802 that correspond with read logic of systolic array 1600 that read the input that will be fed to the array. Systolic cycles 1804 correspond with how those inputs are processed in each stage of the array. Write cycles 1806 correspond to output logic that writes the output to specified destination locations. Inputs read in the cycle 0 of the read cycles 1802 are processed by the systolic array in cycles 0-7 of the systolic cycles 1804. The inputs read in cycle 1 of the read cycles 1802 are processed in cycles 1-8 of the systolic cycles 1804. Processing that begins in cycle 0 of the systolic cycles 1804 are output in cycle "N" of the write cycles 1806. In one embodiment, the value of N may be related to the depth of the systolic array. Processing that begins in cycle 1 of the systolic cycles 1804 are processed in cycles 1-8 and output in cycle N+1 of the write cycles 1806. Due to the pipelined nature of the array, the computations that will result in outputs at cycle N and N+1 are performed in parallel by the various pipelined stages (Stage 1-Stage 8) of the systolic array.

Cycles of the read cycles 1802 lead the systolic cycles 1804 by one or more cycles. For example, cycle 0 of the read cycles 1802 may occur before cycle 0 of the systolic cycles 1804. In one embodiment, cycle 1 of the read cycles 1802 may happen concurrently with cycle 0 of the systolic cycles 1804. During cycle 0 of the systolic cycles 1804, stage 1 of the systolic array calculates Src0+Src1*Src2.0 based on input that is read in cycle 0 of the read cycles. Each of elements 0-7 of Src1 are multiplied in parallel with element 0 of Src2 and added to corresponding elements 0-7 of Src0. The result from Stage 1 is passed to Stage 2. In cycle 1 of the systolic cycles 1804, the Stage 2 accumulates the result computed by Stage 1 in cycle 0 with the result of [Src1+1]*Src2.1, where element 1 of Src2 is multiplied by each element of [Src1+1]. Src1 remains with Stage 1, such that in cycle 1, Stage 1 computes [Src0+1]+Src1*[Src2+1.0] with the next Src0 and Src2 inputs. In stage 1, each of elements 0-7 of Src1 are multiplied in parallel with element 0 of [Src2+1] and added to corresponding elements of [Src0+1]. Processing continues in this pattern for each stage and each cycle, with results being output from stage 8 beginning at cycle N of the write cycles 1806.

As shown in FIG. 18B, timing diagram 1850 shows that systolic array 1700 of FIG. 17A-17B processes the first group of inputs read in cycle 0 of the read cycles 1852 are processed, beginning with cycle 0 of the systolic cycles 1854, in the same way as the first four stages of the eight deep pipeline of systolic array 1600 of FIG. 16. It will be understood that in FIG. 18B, the read cycles 1852 are not necessarily shown to be aligned with their corresponding cycle in the systolic cycles 1854. The read logic of systolic array 1700 can read the first group of inputs in the same manner as systolic array 1600. The first four inputs read in cycles 0 through 3 of the read cycles 1852 can be processed in a pipelined fashion by systolic array 1700. Output is produced in the cycle labeled as "N" in the write cycles 1856. Thus, the latency to first output at cycle N of systolic array 1700 is the same as with systolic array 1700. However, the throughput of systolic array 1700 is reduced, as there is a delay between output of Dst3 and Dst4, which are written in cycle N+8 through N+11 of the write cycles 1856 due to the feedback.

For systolic array 1700, feedback begins in cycle 4 of the systolic cycles 1854. Feedback occurs until cycle 7. Once the feedback begins in cycle 4 of the systolic cycles 1854, only Src1 inputs are read by the processing elements, as represented by the dotted line inputs to cycle 4, 5, 6, and 7 of the systolic cycles 1854. The next group of src0 and src2 inputs will be read by the processing elements beginning in cycle 8 of the systolic cycles 1854. The read logic can delay the read of Src0 and Src2 inputs until those inputs are needed, or, as illustrated, may read those inputs in conjunction with Src1 inputs. Once inputs are read, those inputs may be buffered and re-used by the systolic array.

The advantages of a matrix multiplication accelerator with feedback (systolic array 1700) relative to systolic array 1600 can be summarized as follows: Systolic array 1700 can compute a similar pipeline depth as systolic array 1600 using less hardware. Systolic array 1700 allows the use of the same instructions as the systolic array 1600 allowing workloads developed for the systolic array 1600 to be reused with systolic array 1700. Systolic array 1700 consumes less power by utilizing fewer pipeline stages. Systolic array 1700 can operate at reduced bandwidth for reads and writes relative to systolic array 1600. Systolic array 1700 can be implemented with any number of stages, although it may be optimal better to use multiples of two, in order to enable features of the embodiments shown below. While the architecture of systolic array 1700 has reduced throughout, the same throughput as systolic array 1600 can be enabled by implementing multiple instances of systolic array 1700 in parallel.

Scalable Matrix Multiply Accelerator with Feedback Inputs

Figure 19:
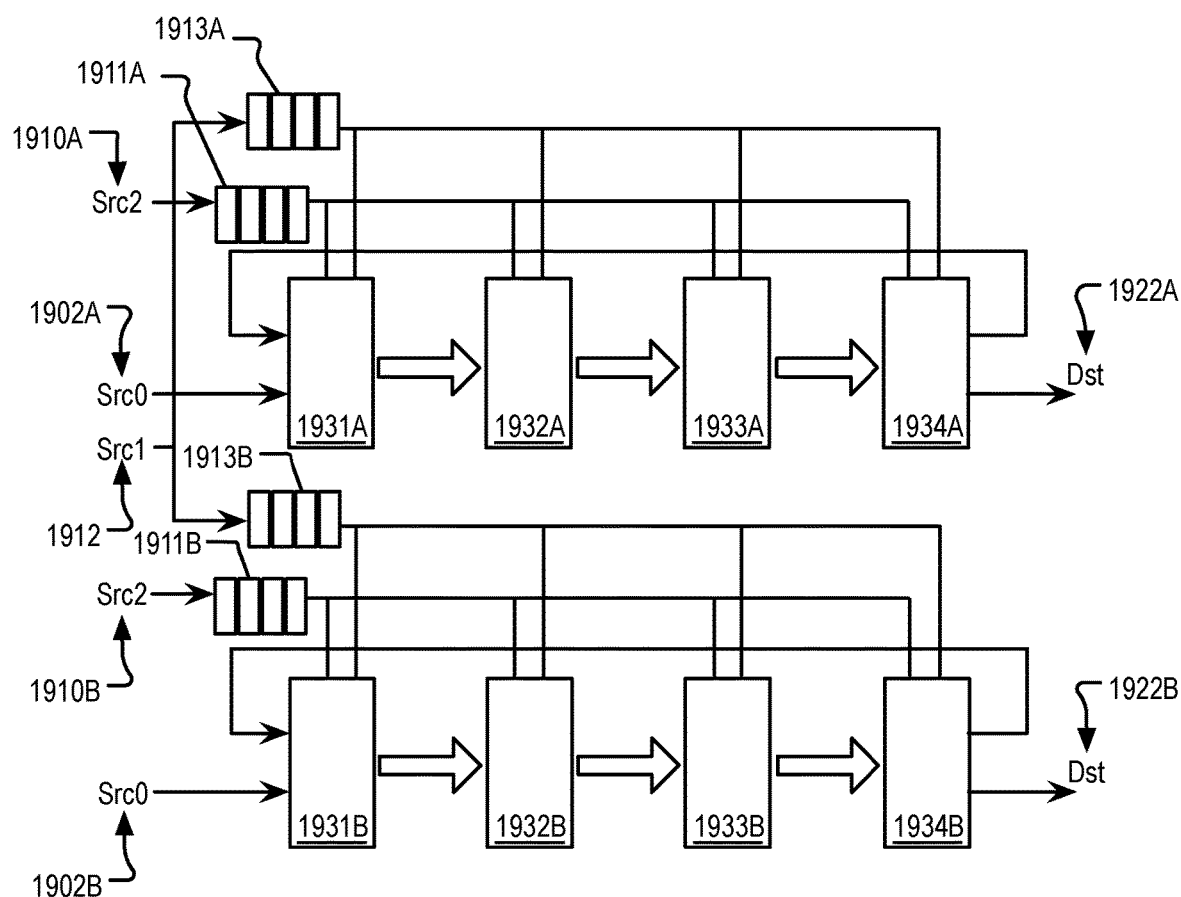
FIG. 19 illustrates a two path Matrix Multiply accelerator on which each path has a depth of four stages.

A second embodiment enables increased throughput through the use of simultaneous instructions execution using parallel units. Several instances or paths of the multiply accelerator are run in parallel. These instances can share Src1 or they can have independent Src1 inputs. Each path will have their own Src2 and Src0 inputs. These instances will have their own src2 and src0 inputs. A version showing two paths with a depth of four stages is shown in FIG. 19. Alternatively, a version using four paths of depth of two stages is shown in FIG. 20.

FIG. 19 illustrates a two-path matrix multiply accelerator 1900 in which each path has a depth of 4 stages. The two-path matrix multiply accelerator 1900 includes input logic 1902A-1902B for Src0 inputs, input buffers 1911A-1911B to store data elements received from input logic 1910A-1910B, and input buffers 1913A-1913B to store data elements received from shared input logic 1912 for Src1. Each stage includes a pair of processing elements, which may operate in parallel. Stage one includes processing elements 1931A-1931B, stage two includes processing elements 1932A-1932B, stage three includes processing elements 1933A-1933B, stage four includes processing elements 1934A-1934B. Hardware logic of each of the processing elements 1931A-1931B, 1932A-1932B, 1931A-1933B, 1934A-1934B can be the same as or similar to the hardware logic of processing elements (e.g., processing elements 1611A-1611D) of systolic array 1600 or systolic array 1700, and may be manufactured with the same process technology or a more advanced process technology. The processing elements of the two-path matrix multiply accelerator 1900 may also operate at a higher frequency relative to implementations of systolic array 1600. The processing elements and may be manufactured using more advanced process technology.

Feedback may be implemented using data selectors that are the same as or similar to data selectors 1704, 1724. Depending on the configuration of the read logic, input data can be pre-fetched into the input buffer in advance, or read from registers or a cache within the two-path matrix multiply accelerator 1900 one or more cycles before input into the processing elements 1931A-1931B. Processing elements 1934A-1934B of stage four can feed back into the corresponding processing elements 1931A-1931B stage one. Dynamic logical depth may be enabled in multiples of four. After a configured number of logical stages, results may be written by output logic 1922A-1922B to a specified destination.

Figure 20:
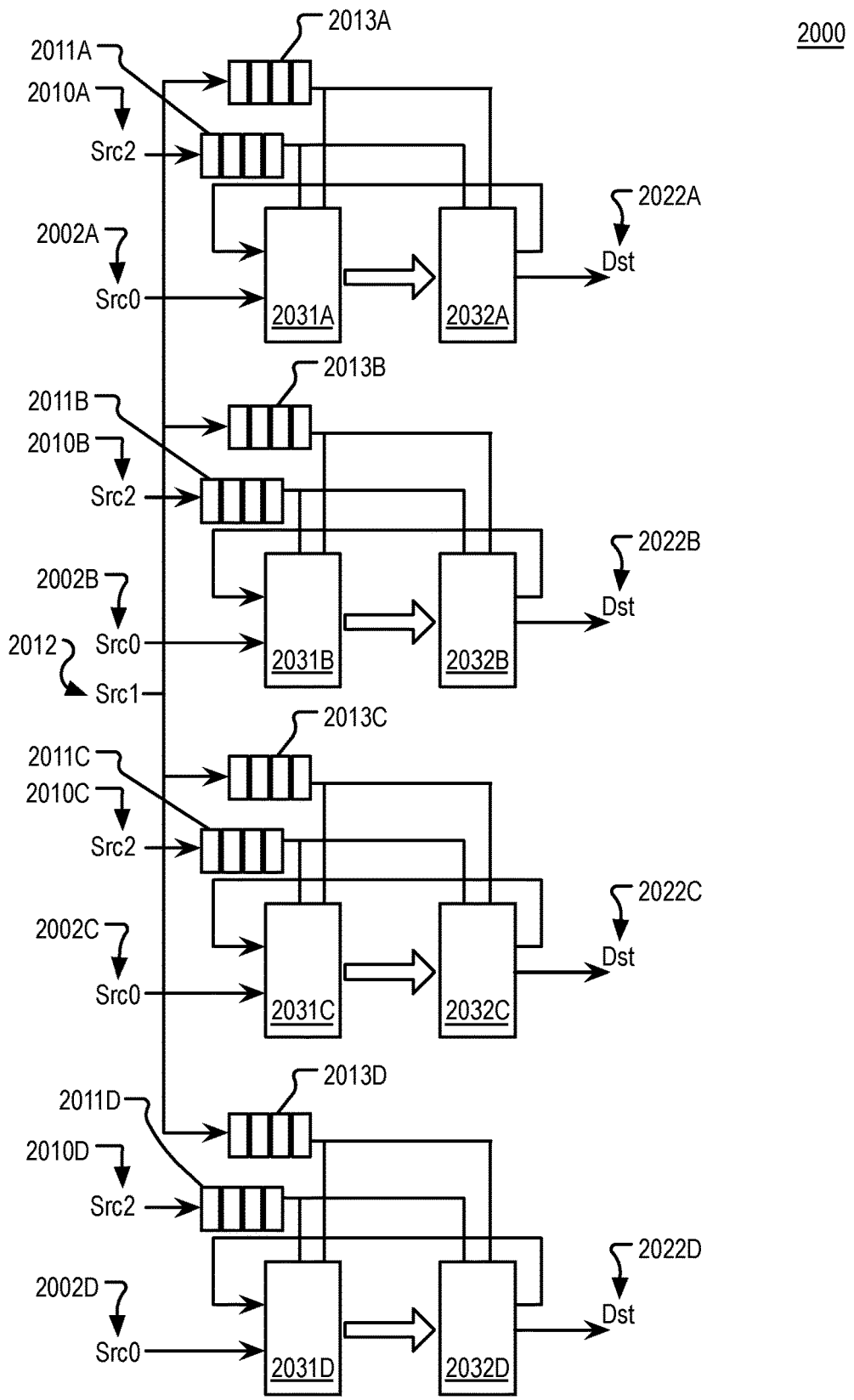
FIG. 20 illustrates a four path Matrix Multiply accelerator on which each path has a depth of two stages.

FIG. 20 illustrates a four-path matrix multiply accelerator 2000 in which each path has a depth of 2 stages. Four-path matrix multiply accelerator 2000 includes the same number of processing elements as two-path matrix multiply accelerator 1900, with the processing elements configured with twice as many paths, but each path is half as deep. Four-path matrix multiply accelerator 2000 includes input logic 2002A-2002D for Src0, input buffers 2011A-211D to store input elements read by input logic 2010A-2010D for Src2, and input buffers 2013A-2013D to store input elements read by shared input logic 2012 for Src1. Processing elements 2031A-2031B enable parallel processing for stage 1. Processing elements 2032A-2032B enable parallel processing for stage 2. Stage 2 of each path can feed back into stage 1 or write results via output logic 2022A-2022D to a specified destination. Processing elements 2031A-2031B, 2032A-2032B may include hardware logic similar to that of processing elements 1931A-1931B, 1932A-1932B, 1931A-1933B, 1934A-1934B and can implement loopback functionality using similar hardware logic.

The advantages of a two-path matrix multiply accelerator 1900 or a four-path matrix multiply accelerator 2000 include scalability, software compatibility, and throughput. The modular architecture of these accelerators enables more efficient scaling relative to an 8-deep systolic array. Different configurations of a matrix multiply accelerator can be tailored for different product needs or use cases without redesign. Additionally, the same software model that is used is independent of the hardware implementation. Algorithms designed for an instruction intended to be executed by a systolic pipeline of eight stages can be used in an implementation using a Matrix Multiply accelerator of 4 stages. Hardware will use feedback to simulate a pipeline of 8 stages in a way that is transparent to the software. Multiple paths can be used in a design requiring high DPAS instruction throughput. Implementations with a greater number of paths can be coupled with higher bandwidth input logic and output logic. In one embodiment, the two-path matrix multiply accelerator 1900 and a four-path matrix multiply accelerator 2000 are configured to bypass inputs with block sparsity at a greater efficiency and/or finer granularity than possible with an 8-deep systolic array.

Sparse Multiplications on the Scalable Matrix Multiply Accelerator

A third embodiment facilitates increased instruction throughput when processing for data with irregular sparsity. Elements of Src1 and Src2 inputs can be individually selected via input multiplexer logic and processing can be performed using only non-zero values.

Figure 21:
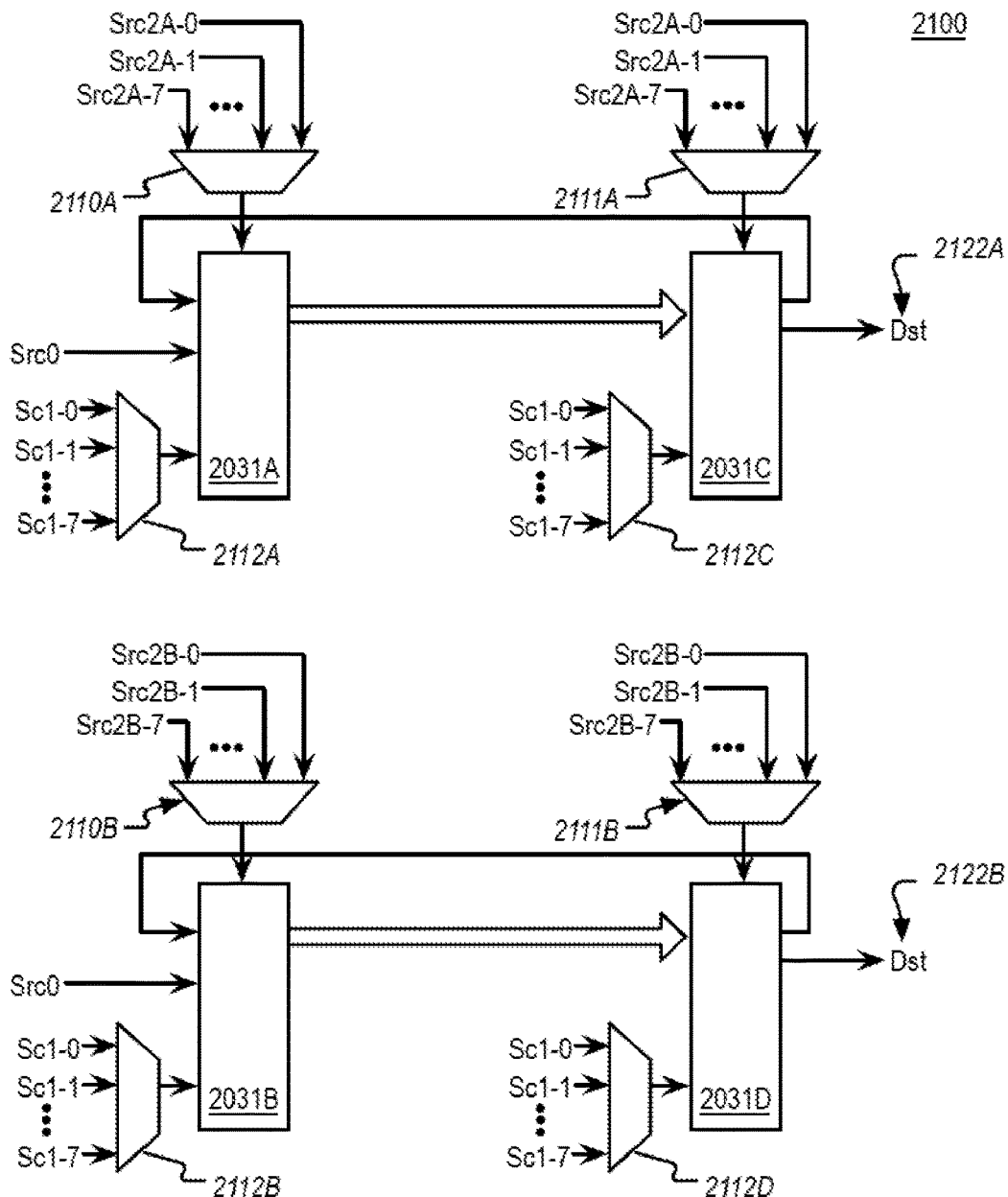
FIG. 21 illustrates a scalable sparse matrix multiply accelerator using systolic arrays with feedback inputs.

FIG. 21 illustrates a scalable sparse matrix multiply accelerator 2100 using systolic arrays with feedback inputs. Scalable sparse matrix multiply accelerator 2100 can include processing elements 2031A-2031D as in four-path matrix multiply accelerator 2000, or any other processing elements described herein. Processing elements 2031A-2021B at the beginning of each path include input logic for Src0. Each stage of each path of scalable sparse matrix multiply accelerator 2100 can receive any element of an independent or shared Src1 via input selectors 2112A-2112D. Each stage of each path can also receive any element of a Src2. Independent Src2 inputs are provided via separate input element selectors (e.g., Src2A via input selector 2110A and input selector 2111A, Src2B via input selector 2110B and input selector 2111B). The separate Src2 input enables the separate paths to compute different instructions. Separate output logic 2122A-2122B is present for each path to enable output for the different instructions.

Figure 22:
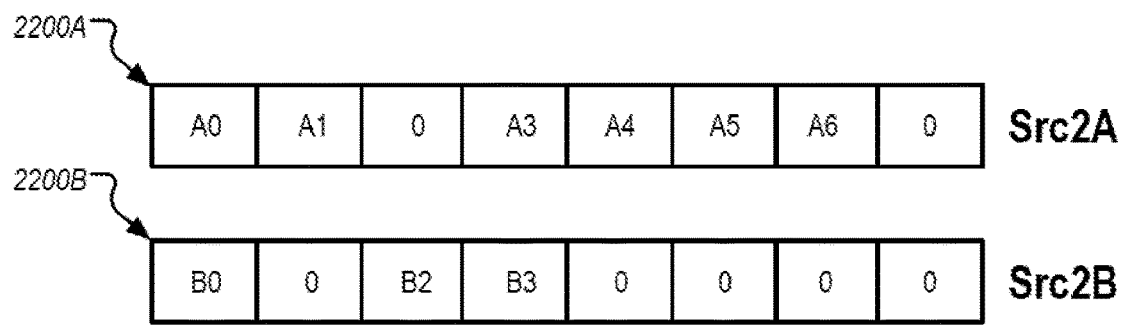
FIG. 22 illustrates Src2 inputs including sparse data.

FIG. 22 illustrates Src2 inputs 2200A-2200B including sparse data. In the illustrated example, sparse Src2 inputs 2200A-2200B (Src2A input 2200A [A0, A1, 0, A3, A4, A5, A6, 0], Src2B input 2200B [B0, 0, B2, B3, 0, 0, 0, 0]) can processed on each path of a variant of scalable sparse matrix multiply accelerator 2100 using a common Src1 input. Each path of the scalable sparse matrix multiply accelerator 2100 can receive a separate own Src0 input.

The first step in the computation process is to read the first Src2 element and rearrange the elements into groups of N elements each, where N is the depth of the path on which the elements will be processed. Other implementations with different numbers of paths can have different group sizes. For example, an accelerator based on four-path matrix multiply accelerator 2000 would use groups of four data elements. If possible, only non-zero data elements will be selected. For example, non-zero values of Src2A 2200A are rearranged into three groups: [A0, A1], [A3, A4], [A5, A6]. The non-zero values of Src2B 2200B are rearranged as two groups: [B0, B2], [B3, 0], with a padding of zero used to complete the second group. This rearrangement is used to allow the first element of each group to be fed to the first stage of the path and the second element of each group to the second stage of the path. While scalable sparse matrix multiply accelerator 2100 does not require elements to be groups, grouping the elements reduces the number of elements that possibly are required to be fed to a stage.

In the second step of the computation process the groups are fed to the paths. Instead of performing four passes to compute an instruction having a depth of eight (e.g., eight feedback passes, each one using two stages), only three feedback passes are required as two elements are zero and do not require processing. The nature of the feedback allows that pass to be bypassed, with the accumulator value being sent directly to the output without consuming a computational stage. To maintain the correct functional computation, the correct Src1 element is input to the stage for a given Src2 element to be computed. Thus, when processing the second group ([A3, A4]), the first stage reads Src1-3 and the second stage reads Src1-4. When processing Src2B 2200B, only two groups ([B0, B2], [B3, 0]) computed. The two groups can be computed using two feedback passes instead of four. In the first pass, Src1-0 and Src1-2 are input to the first and second stages. In the second pass Src1-3 and any Src1 element are input to the first and second stages respectively.

For the third embodiment, the depth of the path constrains the number of zeroes that can be reduced. In a matrix multiply accelerator with two stages in its paths (e.g., scalable sparse matrix multiply accelerator 2100) for inputs of eight elements only reductions of eight, six, four, and two zeros can be performed. In a matrix multiply accelerator with four stages in its paths, only reductions of eight and four zeroes can be performed. To enable a higher resolution of sparse reduction, a fourth embodiment adds an output on each stage of the paths and allows each stage to receive the Src0 input, as shown in FIG. 23.

Figure 23:
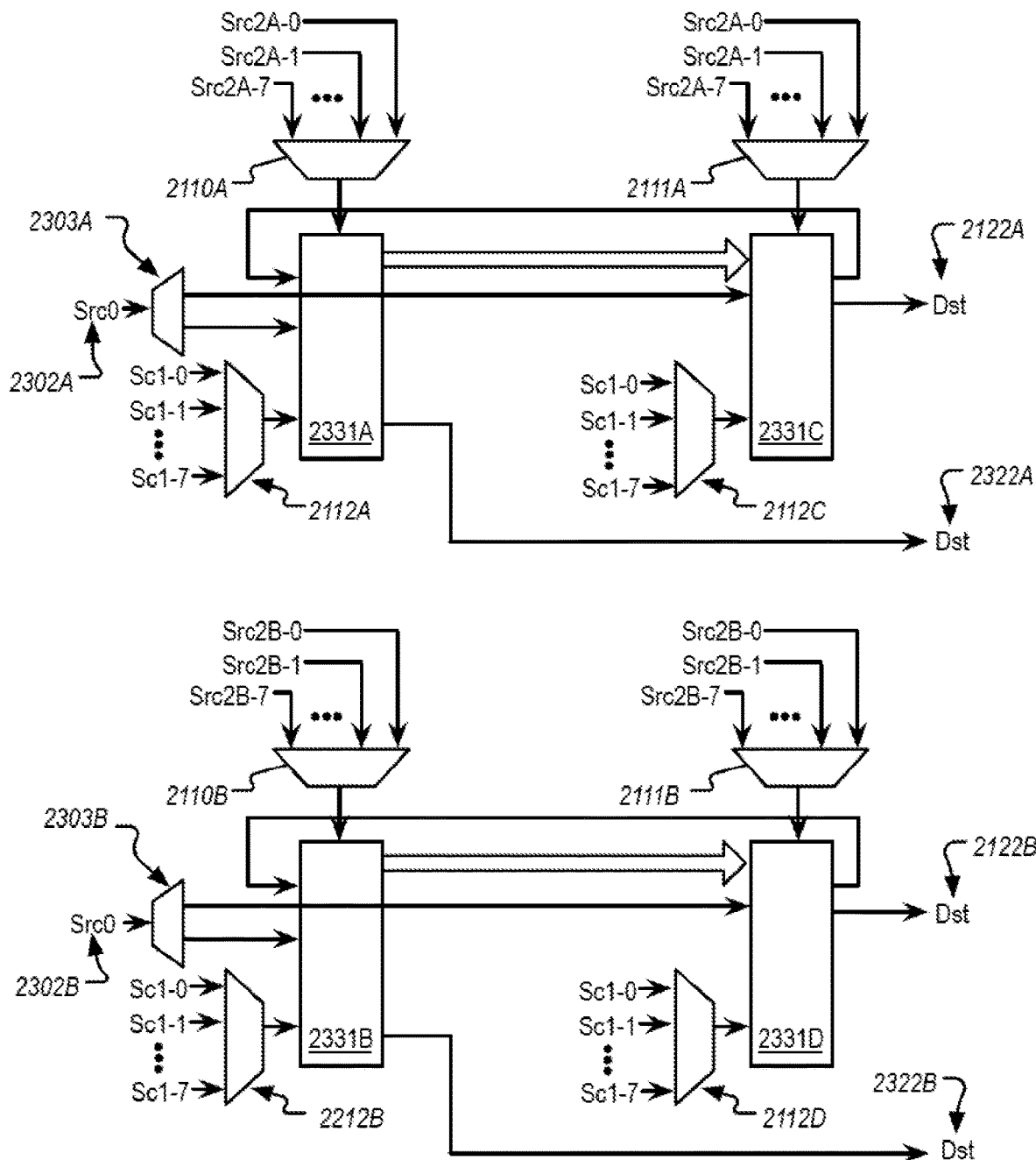
FIG. 23 illustrates a scalable sparse matrix multiply accelerator using systolic arrays with feedback inputs and outputs on each stage.

FIG. 23 shows a scalable sparse matrix multiply accelerator 2300 using systolic arrays with feedback inputs and outputs on each stage. Scalable sparse matrix multiply accelerator 2300 includes similar hardware logic as scalable sparse matrix multiply accelerator 2100, along with additional input and output logic to enable Src0 elements to be provided to each stage of each path and to provide separate outputs for each stage of each path. In addition to input selectors 2110A and 2111A to select Src2A elements for the first path and input selectors 2110A and 2111B to select Src2B input for the second path, an input splitter 2303A-2303B is added for each path for Src0 input. Each input splitter 230A-2302B can include a demultiplexer or similar hardware logic to enable Src0 input elements that are read by input logic 2302A-2302B to be sent to each stage. Input selectors 2112A-2112D are also included to enable Src1 input to be elected by each stage of each path. In addition to output logic 2122A-2122B from the second stage of each path (processing element 2331C-2331D), additional output logic 2322A-2322B is provided to enable output from the first stage of each path (2331A-2331B). The processing elements 2331A-2331C may be otherwise similar to other processing elements described herein.

During operation, scalable sparse matrix multiply accelerator 2300 is configurable to accept groups of only one element. Two groups ([B0, B2], [B3, 0]) are made for the non-zero elements on Src2 for the third embodiment (e.g., scalable sparse matrix multiply accelerator 2100), with the second group including a zero padding. The optimizations shown in FIG. 23 enable the groups to be formed as [B0, B2], [B3]. B0 and B2 will be assigned to the first and second stage of a path (e.g., either of a first set including of processing element 2331A and processing element 2331C or a second set including processing element 2331B and processing element 2331D). After the feedback, B3 will be assigned to the first stage of that path. As the first stage of a path can provide output (e.g., via either output logic 2322A or 2322B), there is no need to consume the second stage of the path (either of processing element 2331C or processing element 2331D). Moreover, the next Src2 input accepted for that path can start from the second stage, so a group of two elements will be assigned to the second and first stage respectively. Src0 for processing the new Src2 input can be assigned to the second stage of the path (e.g., via either output logic 2322A or 2322B)

In addition to the hardware logic of scalable sparse matrix multiply accelerator 2100 illustrated in FIG. 21 and scalable sparse matrix multiply accelerator 2300 illustrated FIG. 23, some embodiments additionally include input and output hardware memory buffers. Input memory buffers can be used to store and have ready groups of Src0 and Src2 inputs, which reduces the need for high bandwidth input logic. The output buffer allows Dst outputs generated in a same cycle to be steadily written to memory at a slower rate, which reduces the need for high bandwidth output logic.

Additionally, some embodiments include a bypass for inputs in which all elements are zero. The bypass allows a direct write of Src0 as by output logic without passing through the systolic array. This bypass is used in concert with a data dependency strategy to prevent read-after-write (RAW) risks among instructions can damage the integrity of the data.

Figure 24:
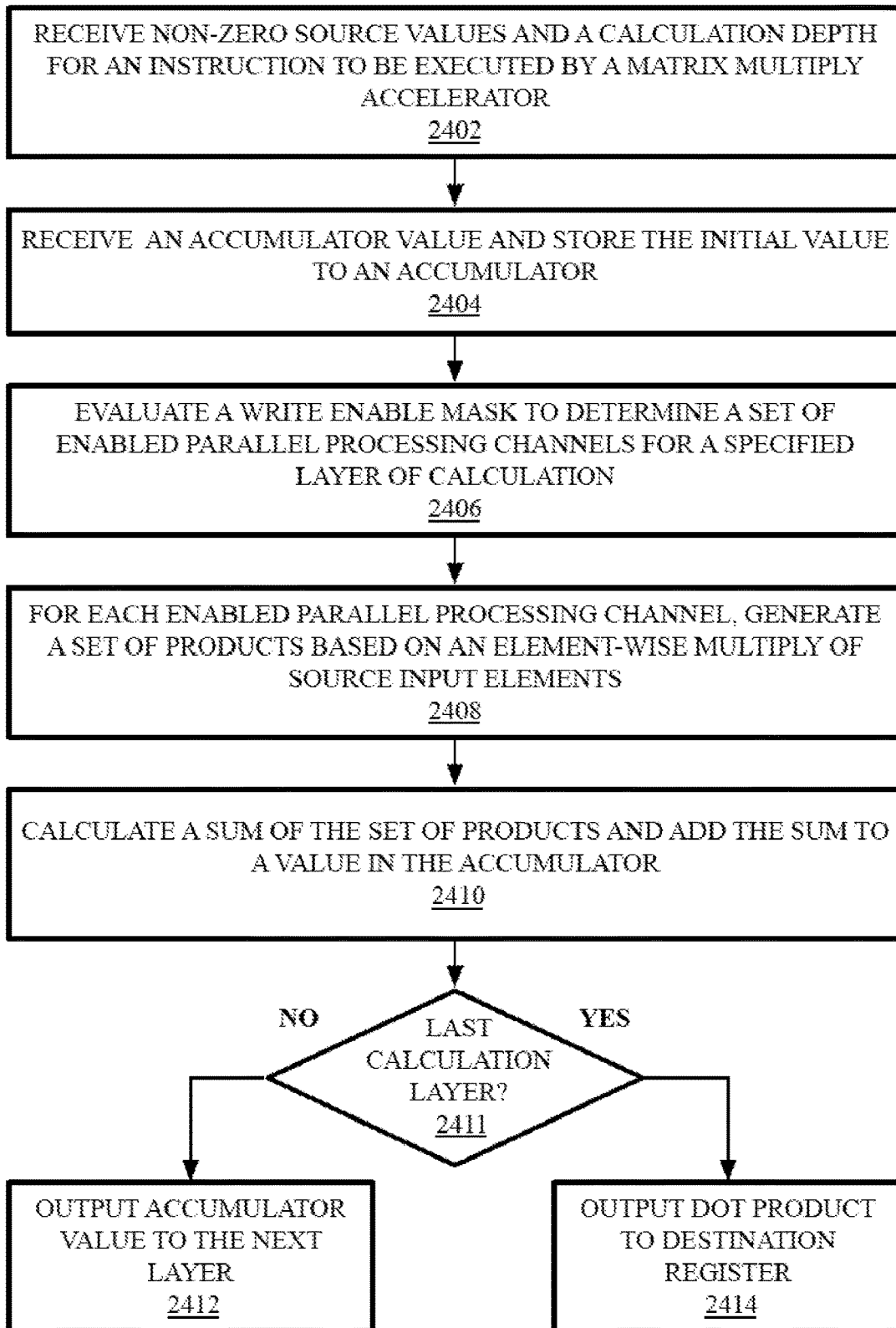
FIG. 24 illustrates a method of performing operations on a scalable sparse matrix multiply accelerator described herein.

FIG. 24 illustrates a method 2400 by which hardware logic at a functional unit can execute an instruction to perform a systolic dot product with accumulate, according to an embodiment. Method 2400 can be performed via hardware and/or firmware logic of a scalable sparse matrix multiply accelerator as described herein. The hardware and/or firmware logic can receive non-zero source values and a calculation depth for an instruction to be executed by a matrix operation accelerator of a GPGPU (2402). The non-zero source values can be non-zero values that are grouped according to a pipeline depth for a path of the scalable sparse matrix multiply accelerator. The calculation depth can specify a number of systolic layers to use to calculate the dot product for the instruction. The logic also receives an accumulator value and store the initial value to an accumulator (2404). The accumulator value may be a zero value, an initial accumulator value, or a result from a previous pipeline stage. For a specified layer of calculation, the logic can evaluate a write enable mask to determine a set of enabled parallel processing channels (2406). The write enable mask can be used to disable calculation of specific channels. The write enable mask can be configured based on a predicate mask supplied with the instruction to be executed.

For each enabled parallel processing channel, the logic can generate a set of products based on an element-wise multiply of source input elements (2408). For example, for a four-element dot product, a four elements of two sources are multiplied to generate the set of products. In each layer of the systolic pipeline, the same Src2 element value is multiplied by multiple different Src1 values. The logic can then calculate a sum of the set of products and add the sum to a value in the accumulator (2410).

Where method 2400 is executed on a processing element at the last calculation layer (2411) the processing element can output the calculated sum to a specified destination register (2414). Otherwise, the processing element can output its accumulator value to the next layer (2412). The next layer may be a next physical layer or a next virtual layer.

Output to the next virtual layer includes providing a feedback value to a processing element at the first stage of the processing pipeline.

In one embodiment, the method 2400 of FIG. 24 can be performed by hardware logic configured based on the pseudocode shown in below.

---

Four Element Systolic Dot Product with Accumulate

---

```
V = Src2.regnum;
temp = Src0.Regnum;   // Accumulated register input
k = Src2.regnum.subregnum;
    for (i = 0; i < sdepth; i++) {
      U = Src1.(Regnum + i);
      Evaluate (WrEn);
      for (n = 0; n < exec_size; n++) {
        if (WrEn.chan[n])
            temp.chan[n] = temp.chan[n]  +
               U.chan[n].0 * V.k.0 +
               U.chan[n].1 * V.k.1 +
               U.chan[n].2 * V.k.2 +
               U.chan[n].3 * V.k.3;
            //chan[n].0 is a 0^{th} byte in the nth dword
       }
    }
    k ++
}
    Dst.regnum = temp;   // Write to output register
```

---

In the pseudocode shown above, Src0, Src1, and Src2 are registers that store operand data. A systolic depth is specified by sdepth. Execution size corresponds with exec_size, and is specifies the number of parallel processing channels. The destination is specified by the Dst register. In the pseudocode, the identified registers reference to regnum and subregnum fields. The regnum field provides the register number for the operand. The subregnum field provides the sub-register number for the operand. The subregnum field, together with the corresponding RegNum field, provides a byte aligned address for the origin of the register region. For some instructions, this field provides bits [4:0] of the byte address, while the RegNum field provides bits [12:5].

Figure 25:
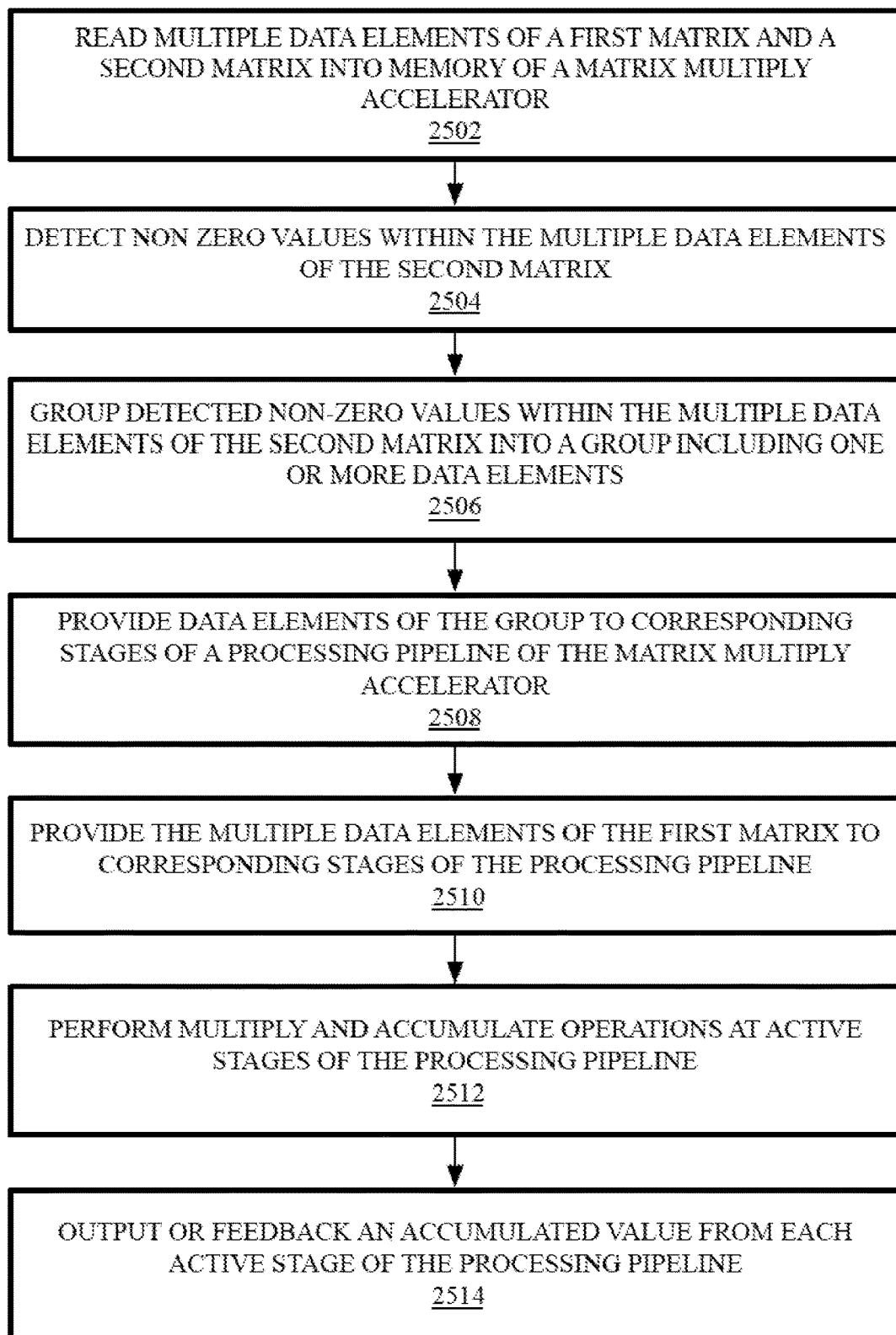
FIG. 25 illustrates a method of performing a matrix multiply operation using a sparse Src2 input matrix.

FIG. 25 illustrates a method 2500 of performing a matrix multiply operation using a sparse Src2 input matrix. Method 2500 can be performed via hardware and/or firmware logic of a scalable sparse matrix multiply accelerator as described herein. Method 2500 specifies operations using sparse data, such as sparse Src2 inputs 2200A-2200B of FIG. 22. Method 2500 can be implemented using scalable sparse matrix multiply accelerator 2100 of FIG. 21 and/or scalable sparse matrix multiply accelerator 2300 of FIG. 23.

Method 2500 includes for the hardware and/or firmware logic to read multiple data elements of a first matrix and a second matrix into memory of a matrix multiply accelerator (2502). The logic can then detect non zero values within the multiple data elements of the second matrix (2504). Detection can be performed using vector comparison logic within the matrix multiply accelerator. The logic can then group detected non-zero values within the multiple data elements of the second matrix into a group including one or more data elements (2506). The logic can then provide data elements of the group to corresponding stages of a processing pipeline of the matrix multiply accelerator (2508). For a path with a two stage pipeline, the groups will include two Src2 elements. The first element of the group will be provided to the first stage and the second element of the group will be provided to the second stage. For scalable sparse matrix multiply accelerator 2100, zero padding is used to pad out a group if needed. For scalable sparse matrix multiply accelerator 2300, zero padding is not required.

The logic then provides the multiple data elements of the first matrix to corresponding stages of the processing pipeline (2510). The multiple data elements provided are those Src1 elements that correspond with active channels that will be computed for a pipeline stage. Any Src1 element can be provided if the element will be operated on using a Src2 zero padding value. Processing elements at each active stage of the processing pipeline performs multiply and accumulate operations (2512). Under some circumstances, for example, where scalable sparse matrix multiply accelerator 2300 is processing a single element group, not all stages of the pipeline are active for an instruction. If a stage is not active for the instruction, the stage can still be used to perform operations for a different instruction. The logic can then output or feedback an accumulated value from each active stage of the processing pipeline (2514). Output can be written to a destination register or memory location when the last stage of processing for an instruction completes. Alternatively, an accumulated value can be sent to the next pipeline stage. Outputting to the next pipeline stage may involve a writing feedback output to the first physical stage of the processing pipeline.

Additional Exemplary Computing Device

Figure 26:
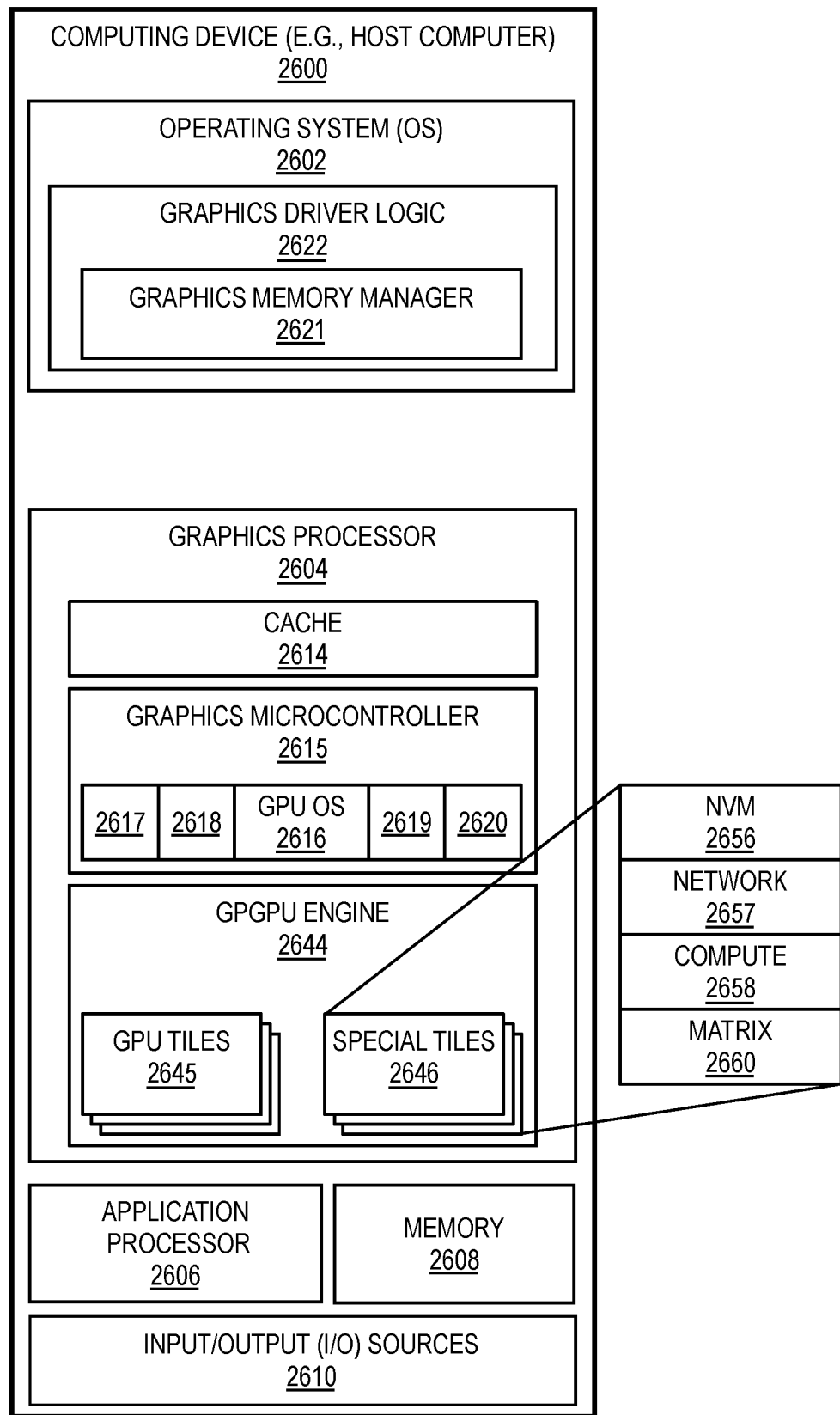
FIG. 26 is a block diagram of a computing device including a graphics processor, according to an embodiment.

FIG. 26 is a block diagram of a computing device 2600 including a graphics processor 2604, according to an embodiment. Versions of the computing device 2600 may be or be included within a communication device such as a set-top box (e.g., Internet-based cable television set-top boxes, etc.), global positioning system (GPS)-based devices, etc. The computing device 2600 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2600 includes a mobile computing device employing an integrated circuit ("IC"), such as system on a chip ("SoC" or "SOC"), integrating various hardware and/or software components of computing device 2600 on a single chip. The computing device 2600 can be a computing device such as the data processing system 100 as in of FIG. 1.

The computing device 2600 includes a graphics processor 2604. The graphics processor 2604 represents any graphics processor described herein. In one embodiment, the graphics processor 2604 includes a cache 2614, which can be a single cache or divided into multiple segments of cache memory, including but not limited to any number of L1, L2, L3, or L4 caches, render caches, depth caches, sampler caches, and/or shader unit caches. In one embodiment the cache 2614 may be a last level cache that is shared with the application processor 2606.

In one embodiment the graphics processor 2604 includes a graphics microcontroller that implements control and scheduling logic for the graphics processor. The control and scheduling logic can be firmware executed by the graphics microcontroller 2615. The firmware may be loaded at boot by the graphics driver logic 2622. The firmware may also be programmed to an electronically erasable programmable read only memory or loaded from a flash memory device within the graphics microcontroller 2615. The firmware may enable a GPU OS 2616 that includes device management/driver logic 2617, 2618, and a scheduler 2619. The GPU OS 2616 may also include a graphics memory manager 2620 that can supplement or replace the graphics memory manager 2621 within the graphics driver logic 2622.

The graphics processor 2604 also includes a GPGPU engine 2644 that includes one or more graphics engine(s), graphics processor cores, and other graphics execution resources as described herein. Such graphics execution resources can be presented in the forms including but not limited to execution units, shader engines, fragment processors, vertex processors, streaming multiprocessors, graphics processor clusters, or any collection of computing resources suitable for the processing of graphics resources or image resources, or performing general purpose computational operations in a heterogeneous processor. The processing resources of the GPGPU engine 2644 can be included within multiple tiles of hardware logic connected to a substrate, as illustrated in FIG. 11B-11D. The GPGPU engine 2644 can include GPU tiles 2645 that include graphics processing and execution resources, caches, samplers, etc. The GPU tiles 2645 may also include local volatile memory or can be coupled with one or more memory tiles, for example, as shown in FIG. 3B-3C.

The GPGPU engine 2644 can also include and one or more special tiles 2646 that include, for example, a non-volatile memory tile 2656, a network processor tile 2657, and/or a general-purpose compute tile 2658. The GPGPU engine 2644 also includes a matrix multiply accelerator 2660. The general-purpose compute tile 2658 may also include logic to accelerate matrix multiplication operations. The non-volatile memory tile 2656 can include non-volatile memory cells and controller logic. The controller logic of the non-volatile memory tile 2656 may be managed by, one of device management/driver logic 2617, 2618. The network processor tile 2657 can include network processing resources that are coupled to a physical interface within the input/output (I/O) sources 2610 of the computing device 2600. The network processor tile 2657 may be managed by one or more of device management/driver logic 2617, 2618.

The matrix multiply accelerator 2660 is a modular scalable sparse matrix multiply accelerator as described herein. The matrix multiply accelerator 2660 can includes multiple processing paths, with each processing path including multiple pipeline stages. Each processing path can execute a separate instruction. In various embodiments, the matrix multiply accelerator 2660 can have architectural features of any one of more of the matrix multiply accelerators described herein. For example, in one embodiment, the matrix multiply accelerator 2660 is a four-deep systolic array 1700 with a feedback loop that is configurable to operate with a multiple of four number of logical stages (e.g., four, eight, twelve, sixteen, etc.). In one embodiment the matrix multiply accelerator 2660 includes one or more instances of a two-path matrix multiply accelerator 1900 with a four stage pipeline or a four-path matrix multiply accelerator 2000 with a two stage pipeline. In one embodiment the matrix multiply accelerator 2660 includes processing elements configured as the scalable sparse matrix multiply accelerator 2100 or the scalable sparse matrix multiply accelerator 2300. The matrix multiply accelerator 2660 can be configured to operate only on non-zero values of at least a Src2 input, and may also bypass operations where zero values are present in the Src1 input. Operations on entire submatrices can be bypassed where block sparsity is present. The matrix multiply accelerator 2660 can also include any logic based on any combination of these embodiments.

As illustrated, in one embodiment, and in addition to the graphics processor 2604, the computing device 2600 may further include any number and type of hardware components and/or software components, including, but not limited to an application processor 2606, memory 2608, and input/output (I/O) sources 2610. The application processor 2606 can interact with a hardware graphics pipeline, as illustrated with reference to FIG. 3A, to share graphics pipeline functionality. Processed data is stored in a buffer in the hardware graphics pipeline and state information is stored in memory 2608. The resulting data can be transferred to a display controller for output via a display device, such as the display device 318 of FIG. 3A. The display device may be of various types, such as Cathode Ray Tube (CRT), Thin Film Transistor (TFT), Liquid Crystal Display (LCD), Organic Light Emitting Diode (OLED) array, etc., and may be configured to display information to a user via a graphical user interface.

The application processor 2606 can include one or processors, such as processor(s) 102 of FIG. 1 and may be the central processing unit (CPU) that is used at least in part to execute an operating system (OS) 2602 for the computing device 2600. The OS 2602 can serve as an interface between hardware and/or physical resources of the computing device 2600 and one or more users. The OS 2602 can include driver logic for various hardware devices in the computing device 2600. The driver logic can include graphics driver logic 2622, which can include the user mode graphics driver 1026 and/or kernel mode graphics driver 1029 of FIG. 10. The graphics driver logic can include a graphics memory manager 2621 to manage a virtual memory address space for the graphics processor 2604.

It is contemplated that in some embodiments the graphics processor 2604 may exist as part of the application processor 2606 (such as part of a physical CPU package) in which case, at least a portion of the memory 2608 may be shared by the application processor 2606 and graphics processor 2604, although at least a portion of the memory 2608 may be exclusive to the graphics processor 2604, or the graphics processor 2604 may have a separate store of memory. The memory 2608 may comprise a pre-allocated region of a buffer (e.g., framebuffer); however, it should be understood by one of ordinary skill in the art that the embodiments are not so limited, and that any memory accessible to the lower graphics pipeline may be used. The memory 2608 may include various forms of random-access memory (RAM) (e.g., SDRAM, SRAM, etc.) comprising an application that makes use of the graphics processor 2604 to render a desktop or 3D graphics scene. A memory controller hub, such as memory controller 116 of FIG. 1, may access data in the memory 2608 and forward it to graphics processor 2604 for graphics pipeline processing. The memory 2608 may be made available to other components within the computing device 2600. For example, any data (e.g., input graphics data) received from various I/O sources 2610 of the computing device 2600 can be temporarily queued into memory 2608 prior to their being operated upon by one or more processor(s) (e.g., application processor 2606) in the implementation of a software program or application. Similarly, data that a software program determines should be sent from the computing device 2600 to an outside entity through one of the computing system interfaces, or stored into an internal storage element, is often temporarily queued in memory 2608 prior to its being transmitted or stored.

The I/O sources can include devices such as touchscreens, touch panels, touch pads, virtual or regular keyboards, virtual or regular mice, ports, connectors, network devices, or the like, and can attach via a platform controller hub 130 as referenced in FIG. 1. Additionally, the I/O sources 2610 may include one or more I/O devices that are implemented for transferring data to and/or from the computing device 2600 (e.g., a networking adapter); or, for a large-scale non-volatile storage within the computing device 2600 (e.g., SSD/HDD). User input devices, including alphanumeric and other keys, may be used to communicate information and command selections to graphics processor 2604. Another type of user input device is cursor control, such as a mouse, a trackball, a touchscreen, a touchpad, or cursor direction keys to communicate direction information and command selections to GPU and to control cursor movement on the display device. Camera and microphone arrays of the computing device 2600 may be employed to observe gestures, record audio and video and to receive and transmit visual and audio commands.

The I/O sources 2610 can include one or more network interfaces. The network interfaces may include associated network processing logic and/or be coupled with the network processor tile 2657. The one or more network interface can provide access to a LAN, a wide area network (WAN), a metropolitan area network (MAN), a personal area network (PAN), Bluetooth, a cloud network, a cellular or mobile network (e.g., 3rd Generation (3G), $4^{th}$ Generation (4G), 5th Generation (5G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2600 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Described herein is an accelerator device including a host interface, a fabric interconnect coupled with the host interface, and one or more hardware tiles coupled with the fabric interconnect, the one or more hardware tiles including sparse matrix multiply acceleration hardware including a systolic array with feedback inputs.

One embodiment provides for a parallel processor comprising a decode unit to decode an instruction into a decoded instruction, where the decoded instruction is an instruction to perform a parallel dot product operation, and a pipelined systolic dot product unit. The pipelined systolic dot product unit is configured to execute the decoded instruction via multiple pipeline stages of a systolic processing pipeline. During execution of the decoded instruction, a dot product computed at a first pipeline stage is configured to be selectably written via output hardware to a location selected from one of output memory and a second pipeline stage and a dot product computed at a third pipeline stage is configured to be selectably written via output hardware to a location selected from one of the output memory and the first pipeline stage. In a further embodiment, the decoded instruction is associated with a first source operand and a second source operand, the first source operand is a reference to memory storing multiple data elements of a first matrix, and the second operand is a reference to memory storing multiple data elements of a second matrix.

One embodiment provides for an accelerator device comprising a host interface, a fabric interconnect coupled with the host interface, and one or more hardware tiles coupled with the fabric interconnect. The one or more hardware tiles include sparse matrix multiply acceleration hardware including a modular systolic processing array with feedback inputs. The modular systolic processing array include one or more processing array modules having a first number of pipeline paths and the first number of pipeline paths have a second number of pipeline stages. A first pipeline stage is configurable to receive feedback output from a final pipeline stage.

One embodiment provides for a method of performing a dot product operation on a set of input matrices via a hardware matrix multiply accelerator having a multi-stage processing pipeline. The method comprises reading, via a first source operand, multiple data elements of a first matrix into memory of the hardware matrix multiply accelerator, reading, via a second source operand, multiple data elements of a second matrix into the memory of the hardware matrix multiply accelerator, detecting non-zero values within the multiple data elements of the second matrix, grouping the non-zero values within the multiple data elements of the second matrix into a group including one or more data elements, where a number of data elements of the group corresponds with a number of stages in the multi-stage processing pipeline of the hardware matrix multiply accelerator, providing a data element of the group to a corresponding stage of the processing pipeline by broadcasting the data element to multiple channels of a processing element of the corresponding stage, multiplying, a provided data element of the group with multiple data elements of the first matrix to generate a set of products, summing the set of products and accumulating a sum of the set of products with an accumulator value, and writing the accumulator value to a next stage of the processing pipeline. In a further embodiment, writing the accumulator value to the next stage of the processing pipeline includes writing a pipeline feedback value to a first stage of the processing pipeline. Additionally, detecting the non-zero values within the multiple data elements of the second matrix can include detecting the non-zero values within the memory of the hardware matrix multiply accelerator.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An accelerator device comprising:
a host interface;
a fabric interconnect coupled with the host interface; and
one or more hardware tiles coupled with the fabric interconnect, the one or more hardware tiles including sparse matrix multiply acceleration hardware including a modular systolic processing array with feedback inputs, the modular systolic processing array including one or more processing array modules including a first pipeline path configurable to execute a first dot product instruction having a first set of inputs and a second pipeline path configurable to execute a second dot product instruction having a second set of inputs.

2. The accelerator device as in claim 1, wherein the modular systolic processing array includes multiple array modules.

3. The accelerator device as in claim 1, wherein at least one of the first pipeline path and the second pipeline path include multiple pipeline stages and the multiple pipeline stages include a first pipeline stage configurable to receive feedback output from a final pipeline stage.

4. The accelerator device as in claim 3, further comprising first output hardware configured to selectably write output of the of the first pipeline stage a location selected from one of output memory and a second pipeline stage and second output hardware configured to selectably write output of the of the final pipeline stage a location selected from one of output memory and the first pipeline stage.

5. The accelerator device as in claim 4, wherein the second pipeline stage is the final pipeline stage.

6. The accelerator device as in claim 1, wherein the one or more processing array modules include pipeline paths configured with shared hardware circuitry to read data elements associated with a first source input and separate hardware circuitry to read data elements associated with a second source input.

7. The accelerator device as in claim 6, wherein the one or more processing array modules include hardware circuitry configured to detect non-zero data elements in the second source input and selectively perform dot product operations based on the non-zero data elements of the second source input and data elements of the first source input that correspond with the non-zero data elements of the second source input.

8. A graphics processor comprising:
a host interface;
a fabric interconnect coupled with the host interface; and
one or more hardware tiles coupled with the fabric interconnect, the one or more hardware tiles including sparse matrix multiply acceleration hardware including a modular systolic processing array with feedback inputs, the modular systolic processing array including one or more processing array modules including a first pipeline path configurable to execute a first dot product instruction having a first set of inputs and a second pipeline path configurable to execute a second dot product instruction having a second set of inputs.

9. The graphics processor as in claim 8, wherein the modular systolic processing array includes multiple array modules.

10. The graphics processor as in claim 8, wherein at least one of the first pipeline path and the second pipeline path include multiple pipeline stages and the multiple pipeline stages include a first pipeline stage configurable to receive feedback output from a final pipeline stage.

11. The graphics processor as in claim 10, further comprising first output hardware configured to selectably write output of the of the first pipeline stage a location selected from one of output memory and a second pipeline stage and second output hardware configured to selectably write output of the of the final pipeline stage a location selected from one of output memory and the first pipeline stage.

12. The graphics processor as in claim 11, wherein the second pipeline stage is the final pipeline stage.

13. The graphics processor as in claim 8, wherein the one or more processing array modules include pipeline paths configured with shared hardware circuitry to read data elements associated with a first source input and separate hardware circuitry to read data elements associated with a second source input.

14. The graphics processor as in claim 13, wherein the one or more processing array modules include hardware circuitry configured to detect non-zero data elements in the second source input and selectively perform dot product operations based on the non-zero data elements of the second source input and data elements of the first source input that correspond with the non-zero data elements of the second source input.

15. A data processing system comprising:
a host interface;
a memory device coupled with the host interface;
a fabric interconnect coupled with the host interface and the memory device; and
one or more hardware tiles coupled with the fabric interconnect and the memory device, the one or more hardware tiles including sparse matrix multiply acceleration hardware including a modular systolic processing array with feedback inputs, the modular systolic processing array including one or more processing array modules including a first pipeline path configurable to execute a first dot product instruction having a first set of inputs and a second pipeline path configurable to execute a second dot product instruction having a second set of inputs.

16. The data processing system as in claim 15, wherein at least one of the first pipeline path and the second pipeline path include multiple pipeline stages and the multiple pipeline stages include a first pipeline stage configurable to receive feedback output from a final pipeline stage.

17. The data processing system as in claim 16, further comprising first output hardware configured to selectably write output of the of the first pipeline stage a location selected from one of output memory and a second pipeline stage and second output hardware configured to selectably write output of the of the final pipeline stage a location selected from one of output memory and the first pipeline stage.

18. The data processing system as in claim 17, wherein the second pipeline stage is the final pipeline stage.

19. The data processing system as in claim 15, wherein the one or more processing array modules include pipeline paths configured with shared hardware circuitry to read data elements associated with a first source input and separate hardware circuitry to read data elements associated with a second source input.

20. The data processing system as in claim 19, wherein the one or more processing array modules include hardware circuitry configured to detect non-zero data elements in the second source input and selectively perform dot product operations based on the non-zero data elements of the second source input and data elements of the first source input that correspond with the non-zero data elements of the second source input.

\* \* \* \* \*